(12) United States Patent
Komada et al.

(10) Patent No.: US 12,084,146 B2
(45) Date of Patent: Sep. 10, 2024

(54) MASTER COMMUNICATION APPARATUS, SLAVE COMMUNICATION APPARATUS, AND WIRELESS COMMUNICATION APPARATUS

(71) Applicant: SHIMANO INC., Sakai (JP)

(72) Inventors: Yasuyuki Komada, Sakai (JP); Takaya Masuda, Sakai (JP); Yoshiyuki Kasai, Sakai (JP); Hiroshi Matsumoto, Sakai (JP)

(73) Assignee: SHIMANO INC., Sakai (JP)

( * ) Notice: Subject to any disclaimer, the term of this patent is extended or adjusted under 35 U.S.C. 154(b) by 936 days.

(21) Appl. No.: 16/562,405

(22) Filed: Sep. 5, 2019

(65) Prior Publication Data
US 2021/0070397 A1   Mar. 11, 2021

(51) Int. Cl.
| | |
|---|---|
| B62M 25/08 | (2006.01) |
| B60L 50/20 | (2019.01) |
| B60L 50/60 | (2019.01) |
| B62K 23/02 | (2006.01) |
| B62M 9/122 | (2010.01) |
| B62M 9/132 | (2010.01) |

(Continued)

(52) U.S. Cl.
CPC ............ *B62M 25/08* (2013.01); *B60L 50/20* (2019.02); *B60L 50/66* (2019.02); *B62K 23/02* (2013.01); *B62M 9/122* (2013.01); *B62M 9/132* (2013.01); *H02J 7/1407* (2013.01); *H04B 1/3827* (2013.01); *B60L 2200/12* (2013.01)

(58) Field of Classification Search
CPC ...... B62M 25/08; B62M 9/122; B62M 9/123; B62M 9/132; H04B 1/38; H04B 1/3822; H04B 1/3827; B62K 23/02
See application file for complete search history.

(56) References Cited

U.S. PATENT DOCUMENTS

| | | | | |
|---|---|---|---|---|
| 6,204,775 B1 * | 3/2001 | Kubacsi | ................ | G08C 17/04 |
| | | | | 340/432 |
| 2002/0075876 A1 | 6/2002 | Yoshikawa et al. | | |
| 2004/0176895 A1 * | 9/2004 | Takeda | ................ | B62M 25/08 |
| | | | | 701/55 |

(Continued)

FOREIGN PATENT DOCUMENTS

JP   2018-008557   1/2018

*Primary Examiner* — Anne Marie M Boehler
(74) *Attorney, Agent, or Firm* — MORI & WARD, LLP

(57) ABSTRACT

A master communication apparatus comprises a master wired communicator, a master wireless communicator, and a master controller. The master wired communicator is configured to communicate with a slave wired communicator of a slave communication apparatus in the human-powered vehicle via a wired communication channel. The master wireless communicator is configured to communicate with a slave wireless communicator of the slave communication apparatus via a wireless communication channel. The master controller is configured to transmit, via one of the master wired communicator and the master wireless communicator, a control signal to control a component of the human-powered vehicle. The master controller is configured to control the master wired communicator and the master wireless communicator in accordance with a priority order. The master controller is configured to set the priority order in accordance with information relating to the master communication apparatus and the slave communication apparatus.

20 Claims, 18 Drawing Sheets

(51) Int. Cl.
*H02J 7/14* (2006.01)
*H04B 1/3827* (2015.01)

(56) References Cited

U.S. PATENT DOCUMENTS

| | | | | |
|---|---|---|---|---|
| 2004/0176896 | A1* | 9/2004 | Takeda | B62M 9/132 |
| | | | | 701/55 |
| 2008/0087131 | A1* | 4/2008 | Tetsuka | B62K 23/06 |
| | | | | 74/502.2 |
| 2014/0141936 | A1* | 5/2014 | Osawa | B62K 23/02 |
| | | | | 477/203 |
| 2014/0156030 | A1* | 6/2014 | Okamoto | H04N 21/42204 |
| | | | | 700/20 |
| 2016/0014252 | A1* | 1/2016 | Biderman | B60L 3/0061 |
| | | | | 701/29.2 |
| 2016/0031527 | A1* | 2/2016 | Bortolozzo | B62M 9/133 |
| | | | | 701/58 |
| 2016/0082772 | A1* | 3/2016 | Biderman | B60K 7/00 |
| | | | | 301/6.5 |
| 2017/0101162 | A1 | 4/2017 | Tachibana et al. | |
| 2017/0171375 | A1* | 6/2017 | Kamata | H04B 1/3822 |
| 2018/0009508 | A1 | 1/2018 | Suzuki et al. | |
| 2018/0229803 | A1 | 8/2018 | Wesling | |
| 2018/0269961 | A1* | 9/2018 | Tsuboi | H04L 12/12 |
| 2018/0281878 | A1* | 10/2018 | Aoki | B62D 55/116 |
| 2018/0304836 | A1* | 10/2018 | DeCia | B60H 1/00778 |
| 2018/0308293 | A1* | 10/2018 | DeCia | G07C 5/008 |
| 2019/0002053 | A1* | 1/2019 | Kakinoki | B62K 19/40 |
| 2019/0106178 | A1* | 4/2019 | Takeshita | B62M 25/08 |
| 2019/0185109 | A1* | 6/2019 | Howell-McLean | B62K 23/02 |
| 2020/0014416 | A1* | 1/2020 | Bayart | H04B 1/385 |
| 2020/0062345 | A1* | 2/2020 | Shahana | B62J 45/4152 |

* cited by examiner

MASTER COMMUNICATION APPARATUS, SLAVE COMMUNICATION APPARATUS, AND WIRELESS COMMUNICATION APPARATUS

BACKGROUND OF THE INVENTION

Field of the Invention

The present invention relates to a master communication apparatus, a slave communication apparatus, and a wireless communication system.

Discussion of the Background

A human-powered vehicle includes a wireless communication device.

SUMMARY OF THE INVENTION

In accordance with a first aspect of the present invention, a master communication apparatus for a human-powered vehicle comprises a master wired communicator, a master wireless communicator, and a master controller. The master wired communicator is configured to communicate with a slave wired communicator of a slave communication apparatus in the human-powered vehicle via a wired communication channel. The master wireless communicator is configured to communicate with a slave wireless communicator of the slave communication apparatus via a wireless communication channel. The master controller is configured to transmit, via one of the master wired communicator and the master wireless communicator, a control signal to control a component of the human-powered vehicle. The master controller is configured to control the master wired communicator and the master wireless communicator in accordance with a priority order. The master controller is configured to set the priority order in accordance with information relating to the master communication apparatus and the slave communication apparatus.

With the master communication apparatus according to the first aspect, it is possible to select one of the wired communication channel and the wireless communication channel in accordance with the information relating to the master communication apparatus and the slave communication apparatus. Thus, it is possible to maintain the reliable communication between the master communication apparatus and the slave communication apparatus.

In accordance with a second aspect of the present invention, the master communication apparatus according to the first aspect further comprises an operating device. The operating device includes a user interface and a base. The user interface is configured to receive a user input. The base is configured to be attached to a steering device of the human-powered vehicle. The master controller is configured to generate the control signal in response to the user input. The master wired communicator and the master wireless communicator are arranged on the base of the operating device.

With the master communication apparatus according to the second aspect, it is possible to maintain the reliable communication between the operating device and the slave communication apparatus.

In accordance with a third aspect of the present invention, a master communication apparatus for a human-powered vehicle comprises a master wired communicator, a master wireless communicator, a master controller, and an operating device. The master wired communicator is configured to communicate with a slave wired communicator of a slave communication apparatus in the human-powered vehicle via a wired communication channel. The master wireless communicator is configured to communicate with a slave wireless communicator of the slave communication apparatus via a wireless communication channel. The master controller is configured to transmit, via one of the master wired communicator and the master wireless communicator, a control signal to control an electric component of the human-powered vehicle. The master controller is configured to control the master wired communicator and the master wireless communicator. The operating device includes a user interface and a base. The user interface is configured to receive a user input. The base is configured to be attached to a steering device of the human-powered vehicle. The master controller is configured to generate a control signal in response to the user input. The master wired communicator and the master wireless communicator are arranged on the base of the operating device.

With the master communication apparatus according to the third aspect, it is possible to select one of the wired communication channel and the wireless communication channel in accordance with the information relating to the master communication apparatus and the slave communication apparatus. Thus, it is possible to maintain the reliable communication between the operating device and the slave communication apparatus.

In accordance with a fourth aspect of the present invention, the master communication apparatus according to the first or second aspect is configured so that the master controller is configured to set the priority order in accordance with communication information relating to the communication between the master communication apparatus and the slave communication apparatus.

With the master communication apparatus according to the fourth aspect, it is possible to maintain the more reliable communication between the master communication apparatus and the slave communication apparatus.

In accordance with a fifth aspect of the present invention, the master communication apparatus according to the fourth aspect is configured so that the communication information relates to communication between the master wired communicator and the slave wired communicator.

With the master communication apparatus according to the fifth aspect, it is possible to maintain the more reliable communication between the master communication apparatus and the slave communication apparatus in accordance with a state of the wired communication channel.

In accordance with a sixth aspect of the present invention, the master communication apparatus according to the fourth aspect is configured so that the communication information relates to communication between the master wireless communicator and the slave wireless communicator.

With the master communication apparatus according to the sixth aspect, it is possible to maintain the more reliable communication between the master communication apparatus and the slave communication apparatus in accordance with a state of the wireless communication channel.

In accordance with a seventh aspect of the present invention, the master communication apparatus according to any one of the fourth to sixth aspects is configured so that the communication information includes acknowledgement information relating to a time period from transmission of the control signal to receipt of an acknowledgement signal from the slave communication apparatus.

With the master communication apparatus according to the first aspect, it is possible to maintain the more reliable communication between the master communication apparatus and the slave communication apparatus in accordance with the acknowledgement information.

In accordance with an eighth aspect of the present invention, the master communication apparatus according to the first or second aspect is configured so that the master controller is configured to set the priority order in accordance with operational status information relating to operational status of at least one of the master wired communicator, the slave wired communicator, the master wireless communicator, and the slave wireless communicator.

With the master communication apparatus according to the eighth aspect, it is possible to maintain the more reliable communication between the master communication apparatus and the slave communication apparatus in accordance with the operational status information.

In accordance with a ninth aspect of the present invention, the master communication apparatus according to the eighth aspect is configured so that the operational status information includes power supply information relating to status of power supply to at least one of the master wired communicator, the slave wired communicator, the master wireless communicator, and the slave wireless communicator.

With the master communication apparatus according to the ninth aspect, it is possible to maintain the more reliable communication between the master communication apparatus and the slave communication apparatus in accordance with the power supply information.

In accordance with a tenth aspect of the present invention, the master communication apparatus according to the first or second aspect is configured so that the master controller is configured to set the priority order in accordance with error information including an error message transmitted by at least one of the master wired communicator, the master wireless communicator, the slave wired communicator, and the slave wireless communicator.

With the master communication apparatus according to the tenth aspect, it is possible to maintain the more reliable communication between the master communication apparatus and the slave communication apparatus in accordance with a state of the at least one of the master wired communicator, the master wireless communicator, the slave wired communicator, and the slave wireless communicator.

In accordance with an eleventh aspect of the present invention, a slave communication apparatus for a human-powered vehicle comprises a slave wired communicator, a slave wireless communicator, and a slave controller. The slave wired communicator is configured to communicate with a master wired communicator of a master communication apparatus in the human-powered vehicle via a wired communication channel. The slave wireless communicator is configured to communicate with a master wireless communicator of the master communication apparatus via a wireless communication channel. The slave controller is configured to receive, via one of the slave wired communicator and the slave wireless communicator, a control signal to control an electric component of the human-powered vehicle. The slave controller is configured to control the slave wired communicator and the slave wireless communicator in accordance with a priority order. The slave controller is configured to set the priority order in accordance with information relating to the master communication apparatus and the slave communication apparatus.

With the slave communication apparatus according to the eleventh aspect, it is possible to select one of the wired communication channel and the wireless communication channel in accordance with the information relating to the master communication apparatus and the slave communication apparatus. Thus, it is possible to maintain the reliable communication between the master communication apparatus and the slave communication apparatus.

In accordance with a twelfth aspect of the present invention, the slave communication apparatus according to the eleventh aspect is configured so that the slave controller is configured to set the priority order in accordance with communication information relating to the communication between the master communication apparatus and the slave communication apparatus.

With the slave communication apparatus according to the twelfth aspect, it is possible to maintain the more reliable communication between the master communication apparatus and the slave communication apparatus.

In accordance with a thirteenth aspect of the present invention, the slave communication apparatus according to the twelfth aspect is configured so that the communication information relates to communication between the master wired communicator and the slave wired communicator.

With the slave communication apparatus according to the thirteenth aspect, it is possible to maintain the more reliable communication between the master communication apparatus and the slave communication apparatus in accordance with a state of the wired communication channel.

In accordance with a fourteenth aspect of the present invention, the slave communication apparatus according to the twelfth aspect is configured so that the communication information relates to communication between the master wireless communicator and the slave wireless communicator.

With the slave communication apparatus according to the fourteenth aspect, it is possible to maintain the more reliable communication between the master communication apparatus and the slave communication apparatus in accordance with a state of the wireless communication channel.

In accordance with a fifteenth aspect of the present invention, the slave communication apparatus according to any one of the eleventh to fourteenth aspects is configured so that the slave controller is configured to set the priority order in accordance with operational status information relating to operational status of at least one of the master wired communicator, the slave wired communicator, the master wireless communicator, and the slave wireless communicator.

With the slave communication apparatus according to the fifteenth aspect, it is possible to maintain the more reliable communication between the master communication apparatus and the slave communication apparatus in accordance with the operational status information.

In accordance with a sixteenth aspect of the present invention, the slave communication apparatus according to the fifteenth aspect is configured so that the operational status information includes power supply information relating to status of power supply to at least one of the master wired communicator, the slave wired communicator, the master wireless communicator, and the slave wireless communicator.

With the slave communication apparatus according to the sixteenth aspect, it is possible to maintain the more reliable communication between the master communication apparatus and the slave communication apparatus in accordance with the power supply information.

In accordance with a seventeenth aspect of the present invention, the slave communication apparatus according to any one of the eleventh to sixteenth aspects is configured so that the slave controller is configured to set the priority order in accordance with error information includes an error message transmitted by at least one of the master wired communicator, the master wireless communicator, the slave wired communicator, and the slave wireless communicator.

With the slave communication apparatus according to the seventeenth aspect, it is possible to maintain the more reliable communication between the master communication apparatus and the slave communication apparatus in accordance with a state of the at least one of the master wired communicator, the master wireless communicator, the slave wired communicator, and the slave wireless communicator.

In accordance with an eighteenth aspect of the present invention, the slave communication apparatus according to any one of the eleventh to seventeenth aspects is configured so that the slave controller is configured to transmit the priority order to the master communication apparatus via one of the wired communication channel and the wireless communication channel.

With the slave communication apparatus according to the eighteenth aspect, it is possible to share the priority order between the master communication apparatus and the slave communication apparatus.

In accordance with a nineteenth aspect of the present invention, a wireless communication system for a human-powered vehicle comprises the master communication apparatus according to any one of the first to tenth aspects and the slave communication apparatus configured to transmit the control signal to the electric component via the wired communication channel.

With the wireless communication system according to the nineteenth aspect, it is possible to maintain the more reliable communication between the master communication apparatus and the slave communication apparatus.

In accordance with a twentieth aspect of the present invention, a wireless communication system for a human-powered vehicle comprises the slave communication apparatus according to any one of the eleventh to eighteenth aspects and the master communication apparatus. The slave communication apparatus is configured to transmit the control signal to the component via the wired communication channel.

With the wireless communication system according to the twentieth aspect, it is possible to maintain the more reliable communication between the master communication apparatus and the slave communication apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
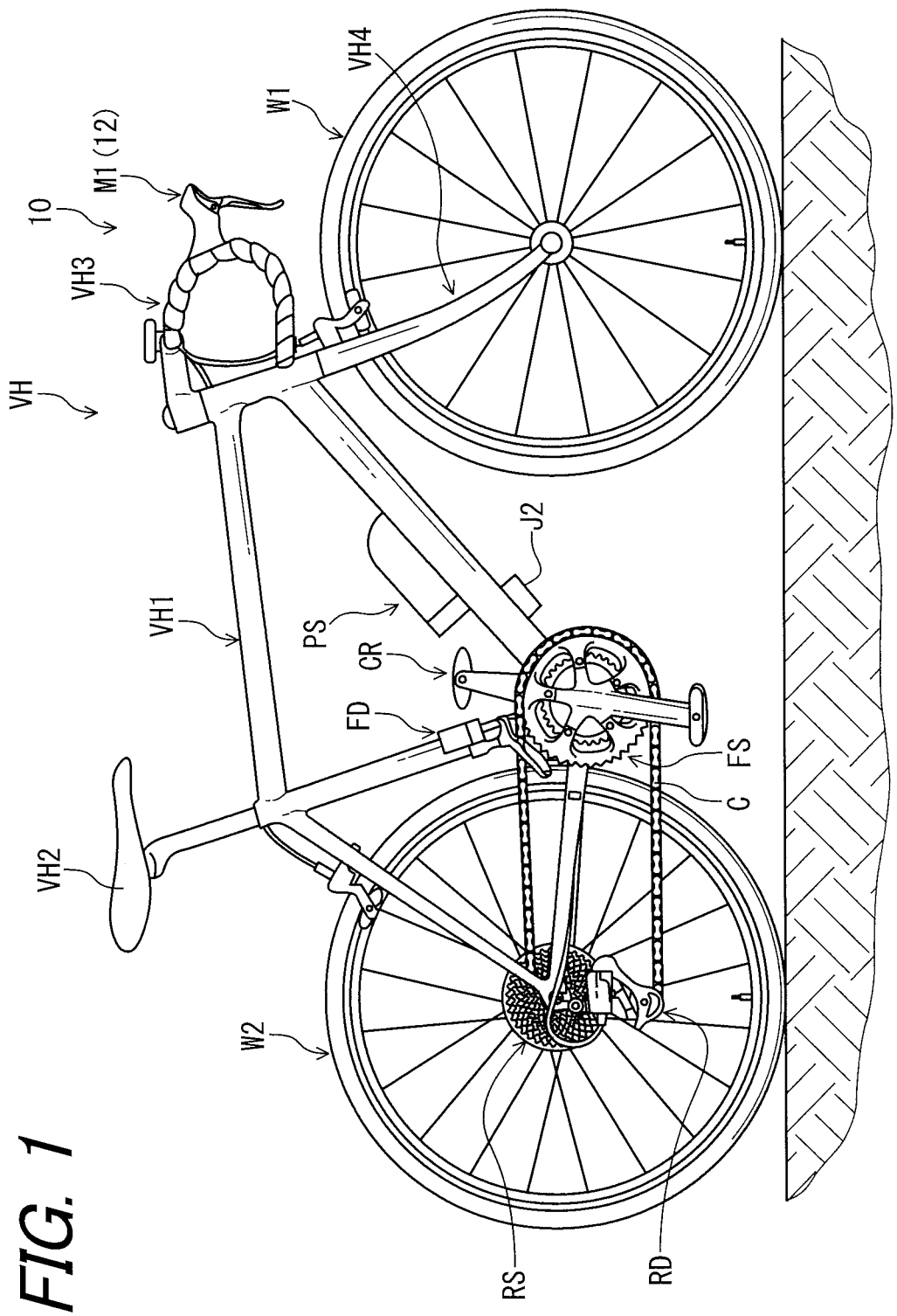
FIG. 1 is a side elevational view of a human-powered vehicle including a wireless communication system in accordance with an embodiment.

The embodiment(s) will now be described with reference to the accompanying drawings, wherein like reference numerals designate corresponding or identical elements throughout the various drawings.

Referring initially to FIG. 1, a human-powered vehicle VH includes a wireless communication system 10 in accordance with an embodiment. For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In this embodiment, the human-powered vehicle VH preferably has a smaller size than that of a four-wheeled automobile. However, the human-powered vehicle VH can have an arbitrary size. Examples of the human-powered vehicle VH include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VH is illustrated as a road bike, the wireless communication system 10 can be applied to mountain bikes, time trial bikes or any type of human-powered vehicles.

The human-powered vehicle VH further includes a vehicle body VH1, a saddle VH2, a steering device VH3, a front fork VH4, a drive train VH5, a rear swing arm VH6, a first wheel W1, and a second wheel W2. The front fork VH4 is rotatably mounted to the vehicle body VH1. The steering device VH3 is secured to the front fork VH4. Examples of the steering device VH3 include a handlebar. The rear swing arm VH6 is pivotally coupled to the vehicle body VH1. The first wheel W1 is rotatably coupled to the front fork VH4. The second wheel W2 is rotatably coupled to the rear swing arm VH6.

In the present application, the following directional terms "front," "rear," "forward," "rearward," "left," "right," "transverse," "upward" and "downward" as well as any other similar directional tennis refer to those directions which are determined on the basis of a user (e.g., a rider) who is in the user's standard position (e.g., on the saddle VH2 or a seat) in the human-powered vehicle VH with facing the steering device VH3. Accordingly, these terms, as utilized to describe the wireless communication system 10 or other components, should be interpreted relative to the human-powered vehicle VH equipped with the wireless communication system 10 as used in an upright riding position on a horizontal surface.

The human-powered vehicle VH includes a crank CR, a front sprocket assembly FS, a rear sprocket assembly RS, a chain C, an electric component RD, an electric component FD, and an electric power source PS. The front sprocket assembly FS is secured to the crank CR. The rear sprocket assembly RS is rotatably mounted to the vehicle body VH1. The chain C is engaged with the front sprocket assembly FS and the rear sprocket assembly RS. The electric component RD is mounted to the vehicle body VH1 and is configured to shift the chain C relative to the rear sprocket assembly RS to change a gear position. Each of the electric components RD and FD includes a gear changing device such as a derailleur. The electric component FD is mounted to the vehicle body VH1 and is configured to shift the chain C relative to the front sprocket assembly FS to change a gear position. In this embodiment, the electric power source PS is mounted to the vehicle body VH1. However, the location of the electric power source PS is not limited to this embodiment.

Figure 2:
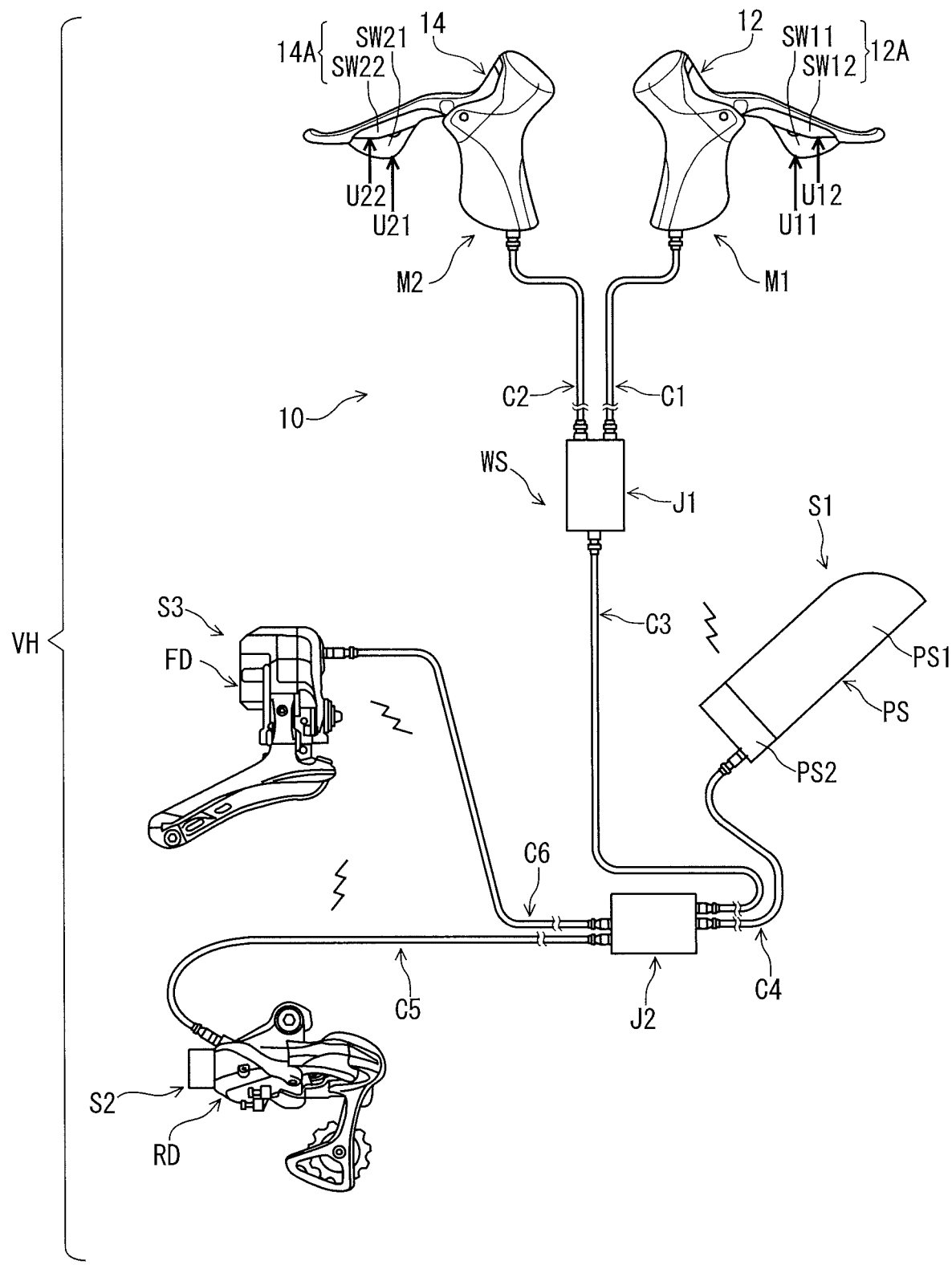
FIG. 2 is a schematic diagram of the human-powered vehicle illustrated in FIG. 1.

As seen in FIG. 2, the human-powered vehicle VH includes an electric wiring structure WS. The electric power source PS is electrically connected to the electric component RD and the electric component FD with the electric wiring structure WS to supply electricity to the electric component RD and the electric component FD.

The electric wiring structure WS includes junctions J1 and J2 and electric cables C1 to C6. Each of the electric cables C1 to C6 includes electric connectors at both ends thereof. The operating device 12 is electrically connected to the junction J1 with the electric cable C1. The operating device 14 is electrically connected to the junction J1 with the electric cable C2. The junction J1 is electrically connected to the junction J2 with the electric cable C3. The junction J2 is electrically connected to the electric power source PS with the electric cable C4. The junction J2 is electrically connected to the electric component RD with the electric cable C5. The junction J2 is electrically connected to the electric component FD with the electric cable C6.

Figure 3:
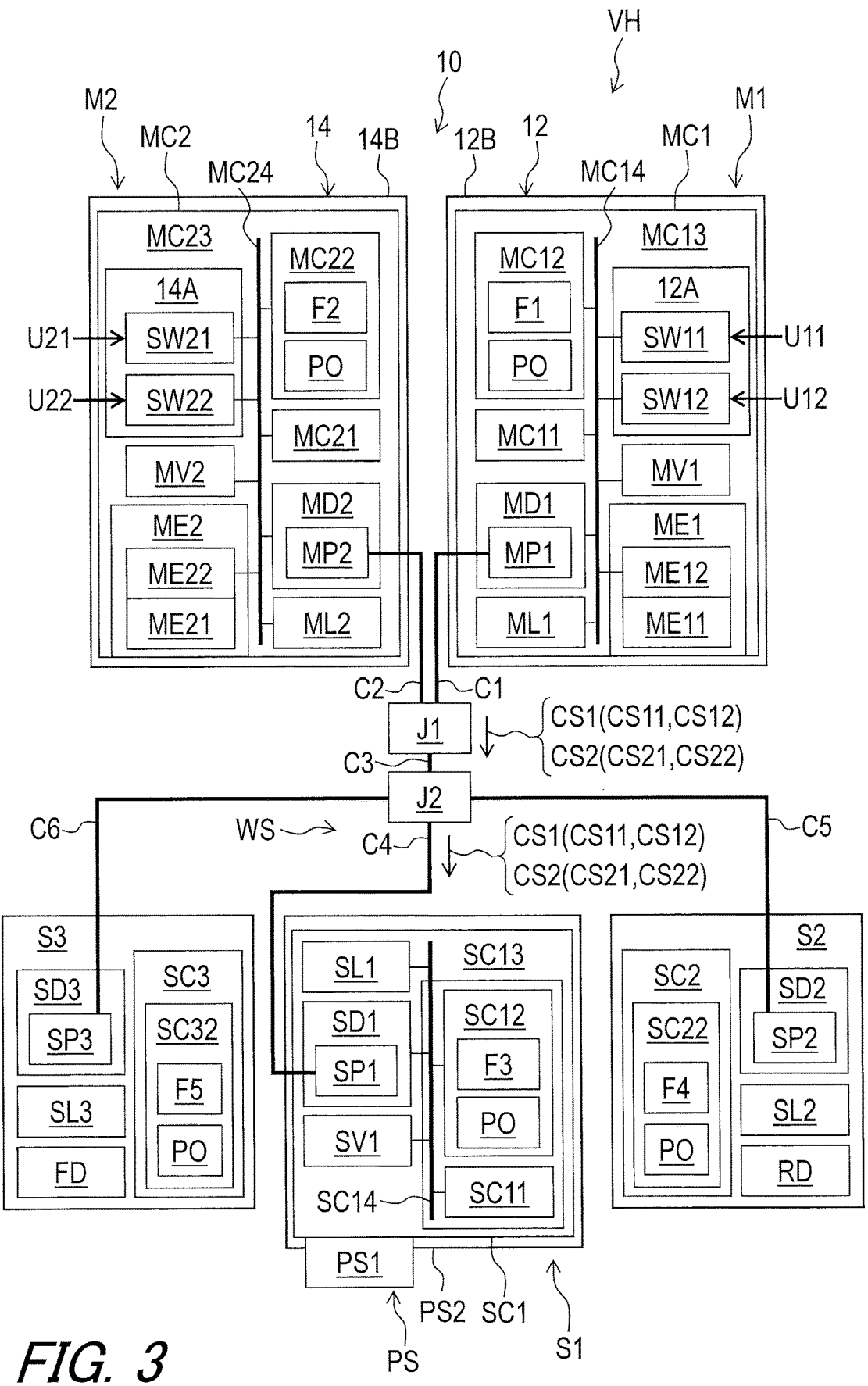
FIG. 3 is a schematic block diagram of the human-powered vehicle illustrated in FIG. 1 (wired communication).

As seen in FIG. 3, the wireless communication system 10 for the human-powered vehicle VH comprises a master communication apparatus and a slave communication apparatus. In this embodiment, the wireless communication system 10 for the human-powered vehicle VH comprises master communication apparatuses M1 and M2 and slave communication apparatuses S1, S2, and S3. However, the total number of the master communication apparatuses is not limited to this embodiment. The total number of the slave communication apparatuses is not limited to this embodiment.

The master communication apparatus M1 for the human-powered vehicle VH comprises a master wired communicator MD1, a master wireless communicator ML1, and a master controller MC1. The master controller MC1 is configured to control the master wired communicator MD1 and the master wireless communicator ML1.

The master communication apparatus M2 for the human-powered vehicle VH comprises a master wired communicator MD2, a master wireless communicator ML2, and a master controller MC2. The master controller MC2 is configured to control the master wired communicator MD2 and the master wireless communicator ML2.

The slave communication apparatus S1 for the human-powered vehicle VH comprises a slave wired communicator SD1, a slave wireless communicator SL1, and a slave controller SC1. The slave controller SC1 is configured to control the slave wired communicator SD1 and the slave wireless communicator SL1.

The slave communication apparatus S2 for the human-powered vehicle VH comprises a slave wired communicator SD2, a slave wireless communicator SL2, and a slave controller SC2. The slave controller SC2 is configured to control the slave wired communicator SD2 and the slave wireless communicator SL2.

Figure 4:
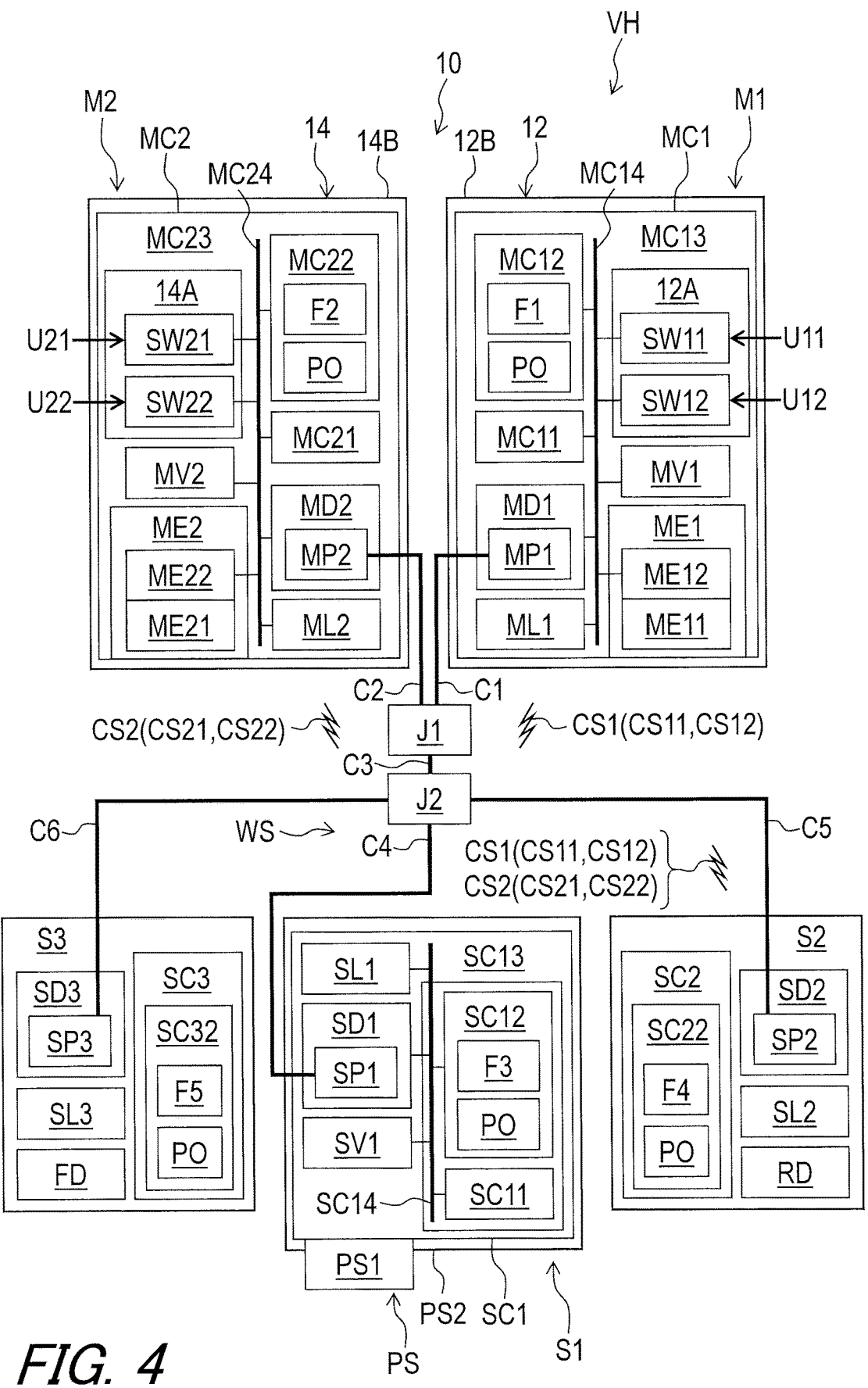
FIG. 4 is another schematic block diagram of the human-powered vehicle illustrated in FIG. 1 (wireless communication).

As seen in FIGS. 3 and 4, the slave communication apparatus S3 for the human-powered vehicle VH comprises a slave wired communicator SD3, a slave wireless communicator SL3, and a slave controller SC3. The slave controller SC3 is configured to control the slave wired communicator SD3 and the slave wireless communicator SL3.

As seen in FIG. 3, the master wired communicator MD1 is configured to communicate with the slave wired communicator SD1 of the slave communication apparatus S1 in the human-powered vehicle VH via a wired communication channel. The master wired communicator MD1 is configured to communicate with the slave wired communicator SD2 of the slave communication apparatus S2 in the human-powered vehicle VH via the wired communication channel. The master wired communicator MD1 is configured to communicate with the slave wired communicator SD3 of the slave communication apparatus S3 in the human-powered vehicle VH via the wired communication channel.

The master wired communicator MD2 is configured to communicate with the slave wired communicator SD1 of the slave communication apparatus S1 in the human-powered vehicle VH via the wired communication channel. The master wired communicator MD2 is configured to communicate with the slave wired communicator SD2 of the slave communication apparatus S2 in the human-powered vehicle VH via the wired communication channel. The master wired communicator MD2 is configured to communicate with the slave wired communicator SD3 of the slave communication apparatus S3 in the human-powered vehicle VH via the wired communication channel.

The slave wired communicator SD1 is configured to communicate with the master wired communicator MD1 of the master communication apparatus M1 in the human-powered vehicle VH via the wired communication channel. The slave wired communicator SD1 is configured to communicate with the master wired communicator MD2 of the master communication apparatus M2 in the human-powered vehicle VH via the wired communication channel.

The slave wired communicator SD2 is configured to communicate with the master wired communicator MD1 of the master communication apparatus M1 in the human-powered vehicle VH via the wired communication channel. The slave wired communicator SD2 is configured to communicate with the master wired communicator MD2 of the master communication apparatus M2 in the human-powered vehicle VH via the wired communication channel.

The slave wired communicator SD3 is configured to communicate with the master wired communicator MD1 of the master communication apparatus M1 in the human-powered vehicle VH via the wired communication channel. The slave wired communicator SD3 is configured to communicate with the master wired communicator MD2 of the master communication apparatus M2 in the human-powered vehicle VH via the wired communication channel.

As seen in FIG. 4, the master wireless communicator ML1 is configured to communicate with the slave wireless communicator SL1 of the slave communication apparatus S1 via a wireless communication channel. The master wireless communicator ML1 is configured to communicate with the slave wireless communicator SL2 of the slave communication apparatus S2 via the wireless communication channel. The master wireless communicator ML1 is configured to communicate with the slave wireless communicator SL3 of the slave communication apparatus S3 via the wireless communication channel.

The master wireless communicator ML2 is configured to communicate with the slave wireless communicator SL1 of the slave communication apparatus S1 via a wireless communication channel. The master wireless communicator ML2 is configured to communicate with the slave wireless communicator SL2 of the slave communication apparatus S2 via the wireless communication channel. The master wireless communicator ML2 is configured to communicate with the slave wireless communicator SL3 of the slave communication apparatus S3 via the wireless communication channel.

The slave wireless communicator SL1 is configured to communicate with the master wireless communicator ML1 of the master communication apparatus M1 via the wireless communication channel. The slave wireless communicator SL1 is configured to communicate with the master wireless communicator ML2 of the master communication apparatus M2 via the wireless communication channel.

The slave wireless communicator SL2 is configured to communicate with the master wireless communicator ML1 of the master communication apparatus M1 via the wireless communication channel. The slave wireless communicator SL2 is configured to communicate with the master wireless communicator ML2 of the master communication apparatus M2 via the wireless communication channel.

The slave wireless communicator SL3 is configured to communicate with the master wireless communicator ML1 of the master communication apparatus M1 via the wireless communication channel. The slave wireless communicator SL3 is configured to communicate with the master wireless communicator ML2 of the master communication apparatus M2 via the wireless communication channel.

As seen in FIGS. 3 and 4, the master controller MC1 is configured to transmit, via one of the master wired communicator MD1 and the master wireless communicator ML1, a control signal CS1 to control the electric component of the human-powered vehicle VH. The master controller MC2 is configured to transmit, via one of the master wired communicator MD2 and the master wireless communicator ML2, a control signal CS2 to control the electric component of the human-powered vehicle VH.

The slave controller SC1 is configured to receive, via one of the slave wired communicator SD1 and the slave wireless communicator SL1, the control signal CS1 and/or CS2 to control the electric component RD and/or FD of the human-powered vehicle VH. The slave controller SC2 is configured to receive, via one of the slave wired communicator SD2 and the slave wireless communicator SL2, the control signal CS1 and/or CS2 to control the electric component RD and/or FD of the human-powered vehicle VH. The slave controller SC3 is configured to receive, via one of the slave wired communicator SD3 and the slave wireless communicator SL3, the control signal CS1 and/or CS2 to control the electric component RD and/or FD of the human-powered vehicle VH.

The control signal CS1 is distinguishable from the control signal CS2. Examples of the control signal CS1 includes control signals CS11 and CS12. Examples of the control signal CS2 includes control signals CS21 and CS22. The control signals CS11, CS12, CS21, and CS22 are distinguishable from each other.

As seen in FIG. 3, the slave communication apparatus S1 is configured to transmit the control signal CS1 and/or CS2 to the electric component RD and/or FD via the wired communication channel. The slave communication apparatus S2 is configured to receive the control signal CS1 from the slave communication apparatus S1 via the wired communication channel. The slave communication apparatus S3 is configured to receive the control signal CS2 from the slave communication apparatus S1 via the wired communication channel.

As seen in FIG. 4, the slave communication apparatus S2 is configured to transmit the control signal CS1 and/or CS2 to the electric component RD and/or FD via the wireless communication channel. The slave communication apparatus S1 is configured to receive the control signal CS1 and/or CS2 from the slave communication apparatus S2 via the wireless communication channel. The slave communication apparatus S2 is configured to receive the control signal CS1 from the slave communication apparatus S1 via the wireless communication channel. The slave communication apparatus S3 is configured to receive the control signal CS2 from the slave communication apparatus S1 via the wireless communication channel.

As seen in FIGS. 3 and 4, the master controller MC1 is configured to select one of the master wired communicator MD1 and the master wireless communicator ML1. The master controller MC2 is configured to select one of the master wired communicator MD2 and the master wireless communicator ML2. In this embodiment, the master controller MC1 is configured to select the master wired communicator MD1 as a default communicator. The master controller MC2 is configured to select the master wired communicator MD2 as a default communicator. However, the master controller MC1 can be configured to select the master wireless communicator ML1 as a default communicator. The master controller MC2 can be configured to select the master wireless communicator ML2 as a default communicator.

The slave controller SC1 is configured to select one of the slave wired communicator SD1 and the slave wireless communicator SL1. The slave controller SC2 is configured to select one of the slave wired communicator SD2 and the slave wireless communicator SL2. The slave controller SC3 is configured to select one of the slave wired communicator SD3 and the slave wireless communicator SL3. In this embodiment, the slave controller SC1 is configured to select the slave wired communicator SD1 as a default communicator. The slave controller SC2 is configured to select the slave wired communicator SD2 as a default communicator. The slave controller SC3 is configured to select the slave wired communicator SD3 as a default communicator. However, the slave controller SC1 can be configured to select the slave wireless communicator SL1 as a default communicator. The slave controller SC2 can be configured to select the slave wireless communicator SL2 as a default communicator. The slave controller SC3 can be configured to select the slave wireless communicator SL3 as a default communicator.

As seen in FIG. 3, the master controller MC1 includes a processor MC11, a memory MC12, a circuit board MC13, and a system bus MC14. The processor MC11 and the memory MC12 are electrically mounted on the circuit board MC13. The processor MC11 includes a central processing unit (CPU) and a memory controller. The processor MC11 is electrically connected to the memory MC12 with the circuit board MC13 and the system bus MC14. The master wired communicator and the master wireless communicator are configured to be electrically mounted on the circuit board. Each of the master wired communicator MD1 and the master wireless communicator ML1 is electrically connected to the processor MC11 and the memory MC12 with the circuit board MC13 and the system bus MC14.

The memory MC12 includes a read only memory (ROM) and a random-access memory (RAM). The memory MC12 includes storage areas each having an address in the ROM and the RAM. The processor MC11 is configured to control the memory MC12 to store data in the storage areas of the memory MC12 and reads data from the storage areas of the memory MC12. The memory MC12 (e.g., the ROM) stores a program. The program is read into the processor MC11, and thereby the configuration and/or algorithm of the master communication apparatus M1 is performed.

Each of the master controller MC2, the slave controller SC1, the slave controller SC2, and the slave controller SC3 has substantially the same structure as the above structure of the master controller MC1 of the master communication apparatus M1. The master controller MC2 includes a processor MC21, a memory MC22, a circuit board MC23, and a system bus MC24. The slave controller SC1 includes a processor SC11, a memory SC12, a circuit board SC13, and a system bus SC14. The slave controller SC2 includes a processor SC21, a memory SC22, a circuit board SC23, and a system bus SC24. The slave controller SC3 includes a processor SC31, a memory SC32, a circuit board SC33, and a system bus SC34. Thus, they will not be described in detail here for the sake of brevity.

As seen in FIG. 3, the master wired communicator MD1, the master wired communicator MD2, the slave wired communicator SD1, the slave wired communicator SD2, and the slave wired communicator SD3 are configured to be connected to each other with the electric wiring structure WS. In this embodiment, the master wired communicator MD1 is electrically connected to the junction J1 with the electric cable C1. The master wired communicator MD2 is electrically connected to the junction J1 with the electric cable C2. The junction J1 is electrically connected to the junction J2 with the electric cable C3. The junction J2 is electrically connected to the electric power source PS with the electric cable C4. The junction J2 is electrically connected to the electric component RD with the electric cable C5. The junction J2 is electrically connected to the electric component FD with the electric cable C6.

The master wired communicator MD1 includes a master communication port MP1. The master wired communicator MD2 includes a master communication port MP2. The slave wired communicator SD1 includes a slave communication port SP1. The slave wired communicator SD2 includes a slave communication port SP2. The slave wired communicator SD3 includes a slave communication port SP3. The electric wiring structure WS is configured to be detachably connected to each of the master communication ports MP1 and MP2 and the slave communication ports SP1, SP2, and SP3. The wired communication channel is established via the electric wiring structure WS, the master communication ports MP1 and MP2, and the slave communication ports SP1, SP2 and SP3.

In this embodiment, the wired communication channel is established using power line communication (PLC) technology. More specifically, the electric wiring structure WS includes a ground line and a voltage line. The PLC technology is used for communicating between electric components. The PLC carries data on a conductor that is also used simultaneously for electric power transmission or electric power distribution to the electric components. In this embodiment, electricity is supplied from the electric power source PS through the electric wiring structure WS connected to the master communication apparatuses M1 and M2 and the slave communication apparatuses S1, S2, and S3. Furthermore, the master communication apparatuses M1 and M2 and the slave communication apparatuses S1, S2, and S3 are configured to receive signals from each other through the electric wiring structure WS using the PLC.

The PLC uses unique device identification (ID) that is assigned to an electric component such as the master communication apparatuses M1 and M2 and the slave communication apparatuses S1, S2, and S3. In this embodiment, the memory MC12 is configured to store device information F1 including unique device ID assigned to the master communication apparatus M1. The memory MC22 is configured to store device information F2 including unique device ID assigned to the master communication apparatus M2. The memory SC12 is configured to store device information MS1 including unique device ID assigned to the slave communication apparatus S1. The memory SC22 is configured to store device information MS2 including unique device ID assigned to the slave communication apparatus S2. The memory SC32 is configured to store device information MS3 including unique device ID assigned to the slave communication apparatus S3.

Based on the unique device ID, each of the master controllers MC1 and MC2 and the slave controllers SL1, SL2, and SL3 is configured to recognize signals which are necessary for itself among signals transmitted via the wired communication channel. For example, the master controller MC1 is configured to generate signals including the device information F1 indicating the master communication apparatus M1. The master controller MC2 is configured to generate signals including the device information F2 indicating the master communication apparatus M2. The slave controller SL1 is configured to generate signals including the device information F3 indicating the slave communication apparatus S1. The slave controller SL2 is configured to generate signals including the device information F4 indicating the slave communication apparatus S2. The slave controller SL3 is configured to generate signals including the device information F5 indicating the slave communication apparatus S3.

The master controller MC1 is configured to recognize signals including the device information F2, F3, F4, or F5 as signals transmitted from the master communication apparatus M2, the slave communication apparatus S1, the slave communication apparatus S2, or the slave communication apparatus S3 via the wired communication channel. The master controller MC2 is configured to recognize signals including the device information F1, F3, F4, or F5 as signals transmitted from the master communication apparatus M1, the slave communication apparatus S1, the slave communication apparatus S2, or the slave communication apparatus S3 via the wired communication channel. The slave controller SC1 is configured to recognize signals including the device information F1, F2, F4, or F5 as signals transmitted from the master communication apparatus M1, the master communication apparatus M2, the slave communication apparatus S2, or the slave communication apparatus S3 via the wired communication channel. The slave controller SC2 is configured to recognize signals including the device information F1, F2, F3, or F5 as signals transmitted from the master communication apparatus M1, the master communication apparatus M2, the slave communication apparatus S1, or the slave communication apparatus S3 via the wired communication channel. The slave controller SC3 is configured to recognize signals including the device information F1, F2, F3, or F4 as signals transmitted from the master communication apparatus M1, the master communication apparatus M2, the slave communication apparatus S1, or the slave communication apparatus S2 via the wired communication channel.

The master wired communicator MD1 is configured to separate input signals to a power source voltage and signals including device information. The master wired communicator MD1 is configured to regulate the power source voltage to a level at which the master communication apparatus M1 can properly operate. The master wired communicator MD1 is further configured to superimpose output signals such as signals including the device information F1 on the power source voltage applied to the electric wiring structure WS from the electric power source PS.

The master wired communicator MD2 has substantially the same structure as the above structure of the master wired communicator MD1. The description of the master wired communicator MD1 can be utilize as the description of the master wired communicator MD2 by replacing "M1," "MD1," and "F1" with "M2," "MD2," and "F2." Thus, it will not be described in detail here for the sake of brevity.

The slave wired communicator SD1 is configured to separate input signals to a power source voltage and signals including device information. The slave wired communicator SD1 is configured to regulate the power source voltage to a level at which the slave communication apparatus S1 can properly operate. The slave wired communicator SD1 is further configured to superimpose output signals such as signals including the device information F3 on the power source voltage applied to the electric wiring structure WS from the electric power source PS. The slave wired communicator SD1 can also be referred to as a slave wired communication circuit SD1.

The slave wired communicators SD2 and SD3 have substantially the same structure as the above structure of the slave wired communicator SD1. The description of the slave wired communicator SD1 can be utilize as the description of the slave wired communicator SD2 by replacing "S1," "SD1," "SL1," and "F3" with "S2," "SD2," "SL2," and "F4" or with "S3," "SD3," "SL3," and "F5." Thus, it will not be described in detail here for the sake of brevity.

The master wireless communicator ML1 includes a signal transmitting circuit, a signal receiving circuit, and an antenna. The master wireless communicator ML1 is configured to superimpose digital signals on carrier wave using a predetermined wireless communication protocol to wirelessly transmit the digital signal. In this embodiment, the master wireless communicator ML1 is configured to encrypt signals using a cryptographic key to generate encrypted wireless signals. The master wireless communicator ML1 is configured to receive a wireless signal via the antenna. In this embodiment, the master wireless communicator ML1 is configured to decode the wireless signal to recognize signals and/or information wirelessly transmitted from another wireless communicator. The master wireless communicator ML1 is configured to decrypt the wireless signal using the cryptographic key. The master wireless communicator ML1 can also be referred to as a master wireless communication circuit ML1.

The master wireless communicator ML2 has substantially the same structure as the above structure of the master wireless communicator ML1. The description of the master wireless communicator ML1 can be utilize as the description of the master wireless communicator ML2 by replacing "ML1" with "ML2." Thus, it will not be described in detail here for the sake of brevity.

The slave wireless communicator SL1 includes a signal transmitting circuit, a signal receiving circuit, and an antenna. The slave wireless communicator SL1 is configured to superimpose digital signals on carrier wave using a predetermined wireless communication protocol to wirelessly transmit the digital signal. In this embodiment, the slave wireless communicator SL1 is configured to encrypt signals using a cryptographic key to generate encrypted wireless signals. The slave wireless communicator SL1 is configured to receive a wireless signal via the antenna. In this embodiment, the slave wireless communicator SL1 is configured to decode the wireless signal to recognize signals and/or information wirelessly transmitted from another wireless communicator. The slave wireless communicator SL1 is configured to decrypt the wireless signal using the cryptographic key. The slave wireless communicator SL1 can also be referred to as a slave wireless communication circuit SL1.

Each of the slave wireless communicators SL2 and SL3 has substantially the same structure as the above structure of the slave wireless communicator SL1. The description of the slave wireless communicator SL1 can be utilize as the description of the slave wireless communicator SL2 or SL3 by replacing "SL1" with "SL2" or "SL3." Thus, it will not be described in detail here for the sake of brevity.

As seen in FIG. 3, the master communication apparatus M1 further comprises the operating device 12. The operating device 12 includes a user interface 12A and a base 12B. The user interface 12A is configured to receive a user input. The base 12B is configured to be attached to the steering device VH3 (see, e.g., FIG. 1) of the human-powered vehicle VH. In this embodiment, the master wired communicator MD1 and the master wireless communicator ML1 are arranged on the base 12B of the operating device 12. The master wired communicator MD1, the master wireless communicator ML1, and the master controller MC1 are provided in the base 12B of the operating device 12. However, the locations of the master wired communicator MD1, the master wireless communicator ML1, and the master controller MC1 are not limited to this embodiment.

The user interface 12A of the operating device 12 includes electrical switches SW11 and SW12. The electrical switch SW11 is configured to receive a user input U11. The electrical switch SW12 is configured to receive a user input U12. In this embodiment, the user input U11 indicates upshifting of the electric component RD. The user input U12 indicates downshifting of the electric component RD. The electrical switches SW11 and SW12 are electrically connected to the master controller MC1. The electrical switches SW11 and SW12 are electrically connected to the processor MC11 and the memory MC12 with the circuit board MC13 and the system bus MC14.

The master controller MC1 is configured to generate the control signal CS11 in response to the user input U11. The master controller MC1 is configured to generate the control signal CS12 in response to the user input U12. The master controller MC1 is configured to control the master wired communicator MD1 to respectively transmit the control signals CS11 and CS12 via the wired communication channel in response to the user inputs U11 and U12 if the master controller MC1 selects the master wired communicator MD1. The master controller MC1 is configured to control the master wireless communicator ML1 to respectively transmit the control signals CS11 and CS12 via the wireless communication channel in response to the user inputs U11 and U12 if the master controller MC1 selects the master wireless communicator ML1.

As seen in FIG. 3, the master communication apparatus M2 further comprises the operating device 14. The operating device 14 includes a user interface 14A and a base 14B. The user interface 14A is configured to receive a user input. The base 14B is configured to be attached to the steering device VH3 (see, e.g., FIG. 1) of the human-powered vehicle VH. In this embodiment, the master wired communicator MD2 and the master wireless communicator ML2 are arranged on the base 14B of the operating device 14. The master wired communicator MD2, the master wireless communicator ML2, and the master controller MC2 are provided in the base 14B of the operating device 14. However, the locations of the master wired communicator MD2, the master wireless communicator ML2, and the master controller MC2 are not limited to this embodiment.

The user interface 14A of the operating device 14 includes electrical switches SW21 and SW22. The electrical switch SW21 is configured to receive a user input U21. The electrical switch SW22 is configured to receive a user input U22. In this embodiment, the user input U21 indicates upshifting of the electric component FD. The user input U22 indicates downshifting of the electric component FD. The electrical switches SW21 and SW22 are electrically connected to the master controller MC2. The electrical switches SW21 and SW22 are electrically connected to the processor MC21 and the memory MC22 with the circuit board MC23 and the system bus MC24.

The master controller MC2 is configured to generate the control signal CS21 in response to the user input U21. The master controller MC2 is configured to generate the control signal CS22 in response to the user input U22. The master controller MC2 is configured to control the master wired communicator MD2 to respectively transmit the control signals CS21 and CS22 via the wired communication channel in response to the user inputs U21 and U22 if the master controller MC2 selects the master wired communicator MD2. The master controller MC2 is configured to control the master wireless communicator ML2 to respectively transmit the control signals CS21 and CS22 via the wireless communication channel in response to the user inputs U21 and U22 if the master controller MC2 selects the master wireless communicator ML2.

As seen in FIG. 3, the slave communication apparatus S1 further comprises the electric power source PS. The electric power source PS includes a battery PS1 and a battery holder PS2. The battery PS1 is provided in the battery holder PS2. In this embodiment, the slave wired communicator SD1 and the slave wireless communicator SL1 are arranged on the battery holder PS2. The slave wired communicator SD1, the slave wireless communicator SL1, and the slave controller SC1 are provided in the battery holder PS2. However, the locations of the slave wired communicator SD1, the slave wireless communicator SL1, and the slave controller SC1 are not limited to this embodiment.

Figure 5:
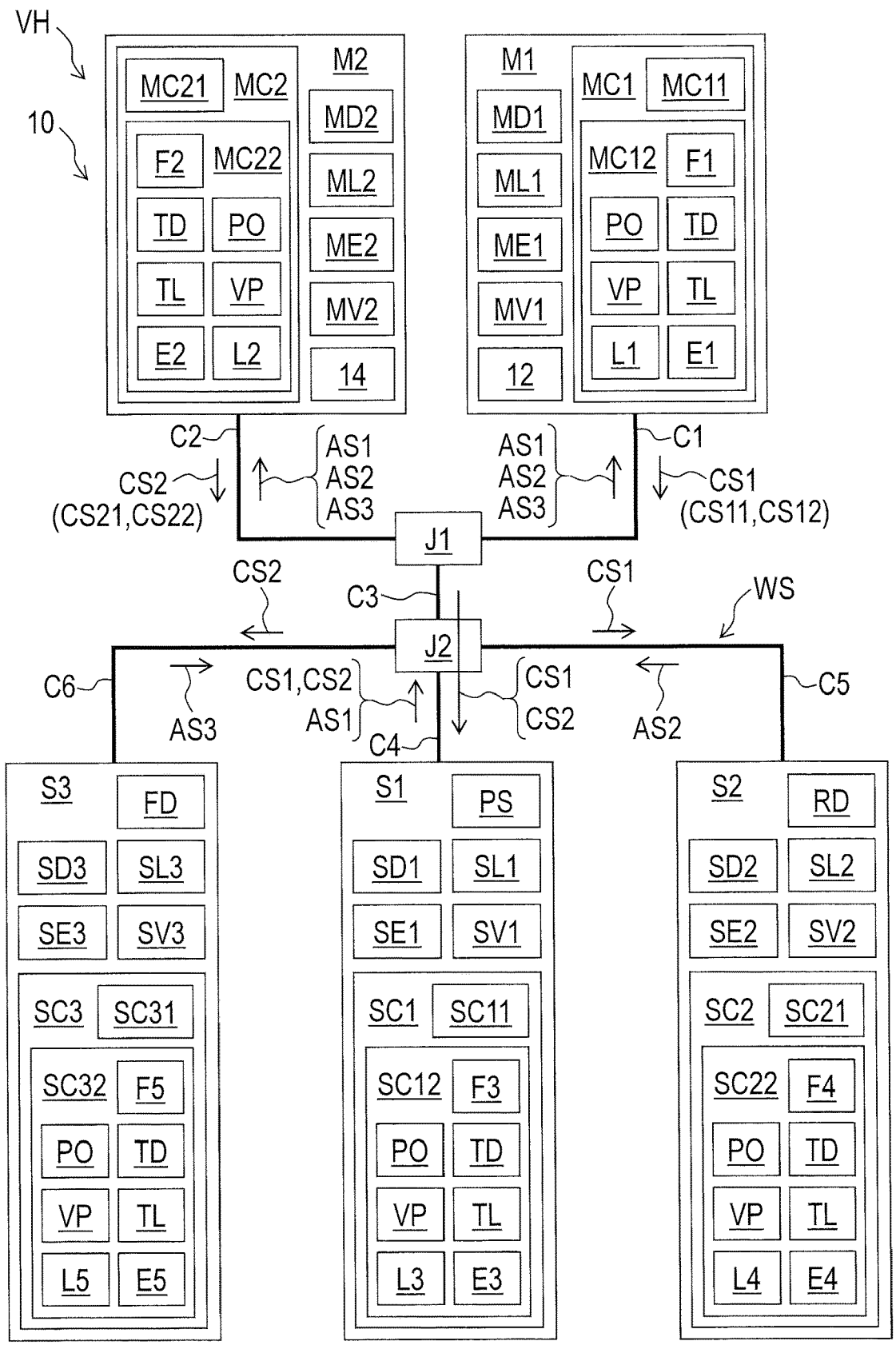
FIG. 5 is another schematic block diagram of the human-powered vehicle illustrated in FIG. 1 (the wired communication).

As seen in FIG. 5, the slave controller SC1 is configured to receive the control signal CS1 from the master communication apparatus M1 via the wired communication channel. The slave controller SC1 is configured to receive the control signal CS2 from the master communication apparatus M2 via the wired communication channel. The slave controller SC1 is configured to transmit the control signal CS1 to the slave communication apparatus S2 if the slave controller SC1 receives the control signal CS1 From the master communication apparatus M1 via the wired communication channel. The slave controller SC1 is configured to transmit the control signal CS2 to the slave communication apparatus S3 if the slave controller SC1 receives the control signal CS2 from the master communication apparatus M2 via the wired communication channel.

Figure 6:
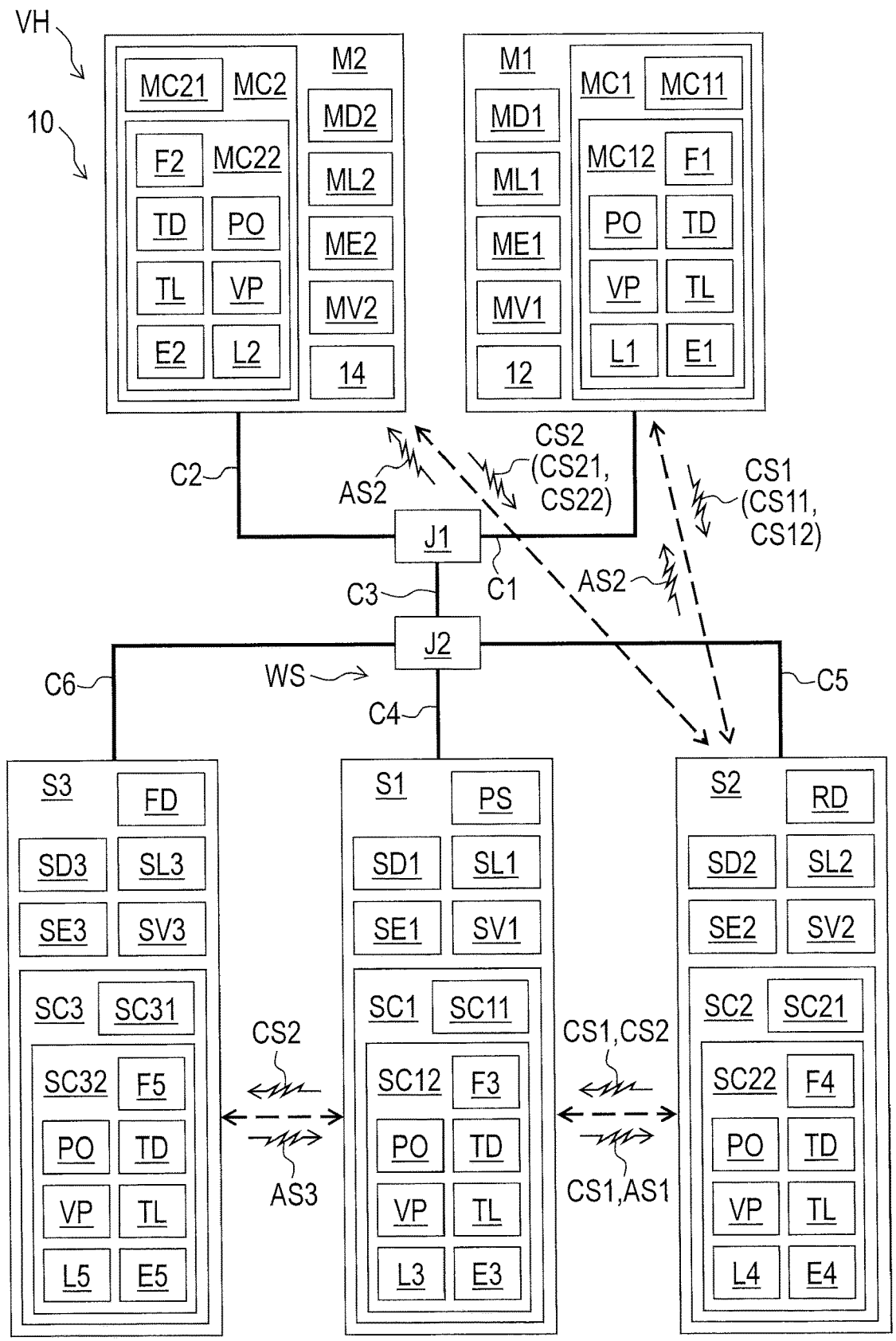
FIG. 6 is another schematic block diagram of the human-powered vehicle illustrated in FIG. 1 (the wireless communication).

As seen in FIG. 6, the slave communication apparatus S2 is paired with each of the master communication apparatuses M1 and M2 and the slave communication apparatus S1 to at least partly establish the wireless communication channel of the wireless communication system 10. The slave communication apparatus S1 is paired with each of the slave communication apparatuses S2 and S3 to at least partly establish the wireless communication channel of the wireless communication system 10.

The slave controller SC2 is configured to receive the control signal CS1 from the master communication apparatus M1 via the wireless communication channel. The slave controller SC2 is configured to receive the control signal CS2 from the master communication apparatus M2 via the wireless communication channel. The slave controller SC2 is configured to transmit the control signal CS1 to the slave communication apparatus S1 if the slave controller SC2 receives the control signal CS1 from the master communication apparatus M1 via the wireless communication channel. The slave controller SC2 is configured to transmit the control signal CS2 to the slave communication apparatus S1 if the slave controller SC2 receives the control signal CS2 from the master communication apparatus M2 via the wireless communication channel.

The slave controller SC1 is configured to receive the control signal CS1 from the slave communication apparatus S2 via the wireless communication channel. The slave controller SC1 is configured to receive the control signal CS2 from the slave communication apparatus S2 via the wireless communication channel. The slave controller SC1 is configured to transmit the control signal CS1 to the slave communication apparatus S2 if the slave controller SC1 receives the control signal CS1 from the slave communication apparatus S2 via the wireless communication channel. The slave controller SC1 is configured to transmit the control signal CS2 to the slave communication apparatus S3 if the slave controller SC1 receives the control signal CS2 from the slave communication apparatus S2 via the wireless communication channel.

Figure 7:
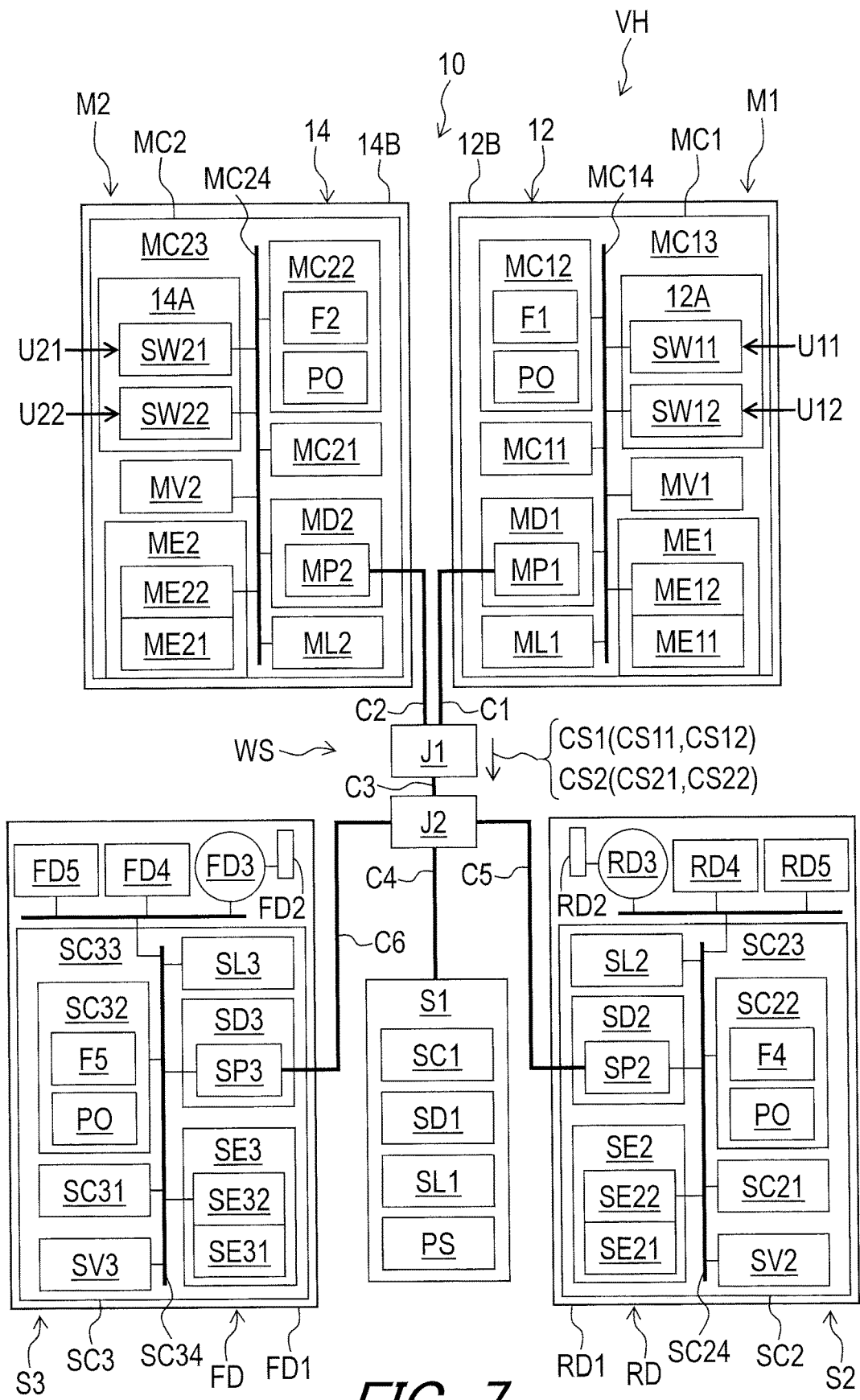
FIG. 7 is another schematic block diagram of the human-powered vehicle illustrated in FIG. 1 (the wired communication).

As seen in FIG. 7, the slave communication apparatus S2 further comprises the electric component RD. The electric component RD includes a base member RD1, a movable member RD2, an actuator RD3, a position sensor RD4, and an actuator driver RD5. The base member RD1 is configured to be attached to the vehicle body VH1 (see, e.g., FIG. 1) of the human-powered vehicle VH. In this embodiment, the slave wired communicator SD2 and the slave wireless communicator SL2 are arranged on the base member RD1 of the electric component RD. The slave wired communicator SD2, the slave wireless communicator SL2, and the slave controller SC2 are provided in the base member RD1 of the electric component RD. However, the locations of the slave wired communicator SD2, the slave wireless communicator SL2, and the slave controller SC2 are not limited to this embodiment.

The movable member RD2 is movably coupled to the base member RD1 and is configured to guide the chain C when shifting the chain C relative to the rear sprocket assembly RS. The actuator RD3 is configured to move the movable member RD2 relative to the base member RD1 to shift the chain C relative to the rear sprocket assembly RS. Examples of the actuator RD3 include a direct current motor and a stepper motor.

The position sensor RD4 and the actuator driver RD5 are electrically connected to the system bus SC24. Examples of the actuator RD3 include a direct-current (DC) motor and a stepper motor. The actuator RD3 includes a rotational shaft operatively coupled to the movable member RD2. The position sensor RD4 is configured to sense a current gear position of the electric component RD. Examples of the position sensor RD4 include a potentiometer and a rotary encoder. The position sensor RD4 is configured to sense an absolute rotational position of the rotational shaft of the actuator RD3 as the current gear position of the electric component RD. The actuator RD3 and the position sensor RD4 are electrically connected to the actuator driver RD5.

The actuator driver RD5 is electrically connected to the actuator RD3 to control the actuator RD3 based on the control signals CS11 and CS12 received by the slave controller SC2. The electric component RD is configured to upshift in response to the control signal CS11. The electric component RD is configured to downshift in response to the control signal CS12.

As seen in FIG. 7, the slave communication apparatus S3 further comprises the electric component FD. The electric component FD includes a base member FD1, a movable member FD2, an actuator FD3, a position sensor FD4, and an actuator driver FD5. The base member FD1 is configured to be attached to the vehicle body VH1 (see, e.g., FIG. 1) of the human-powered vehicle VH. In this embodiment, the slave wired communicator SD3 and the slave wireless communicator SL3 are arranged on the base member FD1 of the electric component FD. The slave wired communicator SD3, the slave wireless communicator SL3, and the slave controller SC3 are provided in the base member FD1 of the electric component FD. However, the locations of the slave wired communicator SD3, the slave wireless communicator SL3, and the slave controller SC3 are not limited to this embodiment.

The movable member FD2 is movably coupled to the base member FD1 and is configured to guide the chain C when shifting the chain C relative to the front sprocket assembly FS. The actuator FD3 is configured to move the movable member FD2 relative to the base member FD1 to shift the chain C relative to the front sprocket assembly FS. Examples of the actuator FD3 include a direct current motor and a stepper motor.

The position sensor FD4 and the actuator driver FD5 are electrically connected to the system bus SC34. Examples of the actuator FD3 include a direct-current (DC) motor and a stepper motor. The actuator FD3 includes a rotational shaft operatively coupled to the movable member FD2. The position sensor FD4 is configured to sense a current gear position of the electric component FD. Examples of the position sensor FD4 include a potentiometer and a rotary encoder. The position sensor FD4 is configured to sense an absolute rotational position of the rotational shaft of the actuator FD3 as the current gear position of the electric component FD. The actuator FD3 and the position sensor FD4 are electrically connected to the actuator driver FD5.

The actuator driver FD5 is electrically connected to the actuator FD3 to control the actuator FD3 based on the control signals CS21 and CS22 received by the slave controller SC3. The electric component FD is configured to upshift in response to the control signal CS21. The electric component FD is configured to downshift in response to the control signal CS22.

As seen in FIG. 7, the master communication apparatus M1 includes an electric power source ME1. The electric power source ME1 is configured to be electrically connected to the master controller MC1, the master wired communicator MD1, and the master wireless communicator ML1. The electric power source ME1 is configured to supply electricity to the master controller MC1, the master wired communicator MD1, and the master wireless communicator ML1.

In this embodiment, the electric power source ME1 includes a battery ME11 and a battery holder ME12. The battery holder ME12 is electrically connected to the master controller MC1, the master wired communicator MD1, and the master wireless communicator ML1. The battery ME11 is configured to be detachably attached to the battery holder ME12. The battery ME11 is configured to be detachable from the battery holder ME12 without substantial damage. Examples of the battery ME11 include a primary battery and a secondary battery. However, the electric power source ME1 is not limited to this embodiment. For example, the electric power source ME1 can include another component such as a capacitor and an electricity generation element (e.g., a piezoelectric element) instead of or in addition to the battery ME11 and the battery holder ME12.

The master controller MC1 is configured to control the electric power source ME1. The master controller MC1 is configured to control the electric power source ME1 to supply electricity to the master controller MC1 regardless of whether electricity is supplied from the electric power source PS. The master controller MC1 is configured to control the electric power source ME1 to supply electricity to the master wired communicator MD1 and the master wireless communicator ML1 if the electricity is not supplied from the electric power source PS. The master controller MC1 is configured to control the electric power source ME1 not to supply electricity to the master wired communicator MD1 and the master wireless communicator ML1 if the electricity is supplied from the electric power source PS.

The master controller MC1 is configured to control the electric power source ME1 to supply electricity to the master wired communicator MD1 and the master wireless communicator ML1 if electricity is interrupted from the electric power source PS or if the remaining level of the electric power source PS is lower than a predetermined level.

The master communication apparatus M1 includes a power-supply sensor MV1. The power-supply sensor MV1 is configured to sense a voltage of electricity supplied from the electric power source PS. The power-supply sensor MV1 is configured to sense the remaining level of the electric power source ME1. The master controller MC1 is configured to determine, based on the voltage sensed by the power-supply sensor MV1, whether electricity is supplied from the electric power source PS. The master controller MC1 is configured to recognize the remaining level of the electric power source ME1 based on the remaining level sensed by the power-supply sensor MV1.

As seen in FIG. 7, the master communication apparatus M2 includes an electric power source ME2 and a power-supply sensor MV2. The electric power source ME2 includes a battery ME21 and a battery holder ME22. The electric power source ME2 has substantially the same structure as the above structure of the electric power source ME1 of the master communication apparatus M1. The power-supply sensor MV2 has substantially the same structure as the above structure of the power-supply sensor MV1 of the master communication apparatus M1. The description of the electric power source ME1 and the power-supply sensor MV1 can be utilize as the description of the electric power source ME2 and the power-supply sensor MV2 by replacing "M1," "MC1," "MD1," "ME1," "ME11," "ME12," and "MV1" with "M2," "MC2," "MD2," "ME2," "ME21," "ME22," and "MV2." Thus, they will not be described in detail here for the sake of brevity.

As seen in FIG. 7, the slave communication apparatus S2 includes an electric power source SE2. The electric power source SE2 is configured to be electrically connected to the slave controller SC2, the slave wired communicator SD2, and the slave wireless communicator SL2. The electric power source SE2 is configured to supply electricity to the slave controller SC2, the slave wired communicator SD2, and the slave wireless communicator SL2.

In this embodiment, the electric power source SE2 includes a battery SE21 and a battery holder SE22. The battery holder SE22 is electrically connected to the slave controller SC2, the slave wired communicator SD2, and the slave wireless communicator SL2. The battery SE21 is configured to be detachably attached to the battery holder SE22. The battery SE21 is configured to be detachable from the battery holder SE22 without substantial damage. Examples of the battery SE21 include a primary battery and a secondary battery. However, the electric power source SE2 is not limited to this embodiment. For example, the electric power source SE2 can include another component such as a capacitor and an electricity generation element (e.g., a piezoelectric element) instead of or in addition to the battery SE21 and the battery holder SE22.

The slave controller SC2 is configured to control the electric power source SE2. The slave controller SC2 is configured to control the electric power source SE2 to supply electricity to the slave controller SC2 regardless of whether electricity is supplied from the electric power source PS. The slave controller SC2 is configured to control the electric power source SE2 to supply electricity to the slave wired communicator SD2 and the slave wireless communicator SL2 if the electricity is not supplied from the electric power source PS. The slave controller SC2 is configured to control the electric power source SE2 not to supply electricity to the slave wired communicator SD2 and the slave wireless communicator SL2 if the electricity is supplied from the electric power source PS.

The slave controller SC2 is configured to control the electric power source SE2 to supply electricity to the slave wired communicator SD2 and the slave wireless communicator SL2 if electricity is interrupted from the electric power source PS or if the remaining level of the electric power source PS is lower than a predetermined level.

The slave communication apparatus S2 includes a power-supply sensor SV2. The power-supply sensor SV2 is configured to sense a voltage of electricity supplied from the electric power source PS. The power-supply sensor SV2 is configured to sense the remaining level of the electric power source SE2. The slave controller SC2 is configured to determine, based on the voltage sensed by the power-supply sensor SV2, whether electricity is supplied from the electric power source PS. The slave controller SC2 is configured to recognize the remaining level of the electric power source SE2 based on the remaining level sensed by the power-supply sensor SV2.

As seen in FIG. 7, the slave communication apparatus S3 includes an electric power source SE3 and a power-supply sensor SV3. The electric power source SE3 includes a battery SE31 and a battery holder SE32. The electric power source SE3 has substantially the same structure as the above structure of the electric power source SE2 of the slave communication apparatus S2. The power-supply sensor SV3 has substantially the same structure as the above structure of the power-supply sensor SV2 of the slave communication apparatus S2. The description of the electric power source SE3 and the power-supply sensor SV3 can be utilize as the description of the electric power source SE2 and the power-supply sensor SV2 by replacing "S2," "SC2," "SD2," "SE2," "SE21," "SE22," and "SV2" with "S3," "SC3," "SD3," "SE3," "SE31," "SE32," and "SV3." Thus, they will not be described in detail here for the sake of brevity.

As seen in FIGS. 5 and 6, the wireless communication system 10 has a priority order PO. The priority order PO indicates that one of the wired communication channel and the wireless communication channel is given priority over the other of the wired communication channel and the wireless communication channel. Each of the memories MC12, MC22, SC12, SC22, and SC32 is configured to store the priority order PO. The priority order PO indicates, as a default setting, that the wired communication channel is given priority over the wireless communication channel. Thus, the master communication apparatuses M1 and M2 and the slave communication apparatuses S1, S2, and S3 are configured to communicate via the wired communication channel in the initial state. However, the priority order PO can indicate, as a default setting, that the wireless communication channel is given priority over the wired communication channel.

As seen in FIGS. 5 and 6, the master controller MC1 is configured to control the master wired communicator MD1 and the master wireless communicator ML1 in accordance with the priority order PO. As seen in FIG. 5, the master controller MC1 is configured to control the master wired communicator MD1 to transmit and receive signals via the wired communication channel in accordance with the priority order PO indicating that the wired communication channel is given priority over the wireless communication channel. As seen in FIG. 6, the master controller MC1 is configured to control the master wireless communicator ML1 to transmit and receive signals via the wireless communication channel in accordance with the priority order PO indicating that the wireless communication channel is given priority over the wired communication channel.

As seen in FIGS. 5 and 6, the master controller MC1 is configured to set the priority order PO in accordance with information relating to the master communication apparatus M1 and the slave communication apparatus S1 or S2. In this embodiment, the master controller MC1 is configured to set the priority order PO in accordance with communication information relating to communication between the master communication apparatus M1 and the slave communication apparatus S1 or S2.

The communication information relates to communication between the master wired communicator MD1 and the slave wired communicator SD1. The communication information relates to communication between the master wireless communicator ML1 and the slave wireless communicator SL2. The communication information includes acknowledgement information relating to a time period from transmission of the control signal CS1 to receipt of an acknowledgement signal AS1 or AS2 from the slave communication apparatus S1 or S2.

As seen in FIG. 5, the slave controller SC1 is configured to control the slave wired communicator SD1 to transmit the acknowledgement signal AS1 to the master communication apparatus M1 via the wired communication channel if the slave controller SC1 receives the control signal CS1 from the master communication apparatus M1 via the wired communication channel. The master controller MC1 is configured to measure a time period TP11 from the transmission of the control signal CS1 via the wired communication channel to receipt of the acknowledgement signal AS1 from the slave communication apparatus S1 via the wired communication channel. The master controller MC1 is configured to compare the time period TP11 with a reference wired time period TD if the master controller MC1 receives the acknowledgement signal AS1 via the wired communication channel. The memory MC12 is configured to store the reference wired time period TD. The master controller MC1 is configured to conclude that the wired communication is normal between the master communication apparatus M1 and the slave communication apparatus S1 if the time period TP11 is equal to or shorter than the reference wired time period TD. The master controller MC1 is configured to conclude that the wired communication is abnormal between the master communication apparatus M1 and the slave communication apparatus S1 if the time period TP11 exceeds the reference wired time period TD.

The master controller MC1 is configured to set the priority order PO in accordance with the communication information relating to whether the wired communication is normal between the master communication apparatus M1 and the slave communication apparatus S1. The master controller MC1 is configured to set the priority order PO indicating that the wired communication channel is given priority over the wireless communication channel if the wired communication is normal between the master communication apparatus M1 and the slave communication apparatus S1. Thus, the master controller MC1 is configured to use the wired communication channel to transmit the control signal CS1 if the wired communication is normal. The master controller MC1 is configured to set the priority order PO indicating that the wireless communication channel is given priority over the wired communication channel if the wired communication is abnormal between the master communication apparatus M1 and the slave communication apparatus S1. Thus, the master controller MC1 is configured to use the wireless communication channel to transmit the control signal CS1 if the wired communication is abnormal.

As seen in FIG. 6, the slave controller SC2 is configured to control the slave wireless communicator SL2 to transmit the acknowledgement signal AS2 to the master communication apparatus M1 via the wireless communication channel if the slave controller SC2 receives the control signal CS1 from the master communication apparatus M1 via the wireless communication channel. The master controller MC1 is configured to measure a time period TP12 from transmission of the control signal CS1 via the wireless communication channel to receipt of the acknowledgement signal AS2 via the wireless communication channel. The master controller MC1 is configured to compare the time period TP12 with a reference wireless time period TL if the master controller MC1 receives the acknowledgement signal AS2 via the wireless communication channel. The memory MC12 is configured to store the reference wireless time period TL. The master controller MC1 is configured to conclude that the wireless communication is normal between the master communication apparatus M1 and the slave communication apparatus S2 if the time period TP12 is equal to or shorter than the reference wireless time period TL. The master controller MC1 is configured to conclude that the wireless communication is abnormal between the master communication apparatus M1 and the slave communication apparatus S2 if the time period TP12 exceeds the reference wireless time period TL.

The master controller MC1 is configured to set the priority order PO in accordance with the communication information relating to whether the wireless communication is normal or abnormal between the master communication apparatus M1 and the slave communication apparatus S2. The master controller MC1 is configured to set the priority order PO indicating that the wireless communication channel is given priority over the wired communication channel if the wireless communication is normal between the master communication apparatus M1 and the slave communication apparatus S2. Thus, the master controller MC1 is configured to use the wireless communication channel to transmit the control signal CS1 if the wireless communication is normal. The master controller MC1 is configured to set the priority order PO indicating that the wired communication channel is given priority over the wireless communication channel if the wireless communication is abnormal between the master communication apparatus M1 and the slave communication apparatus S2. Thus, the master controller MC1 is configured to use the wired communication channel to transmit the control signal CS1 if the wireless communication is abnormal.

As seen in FIGS. 5 and 6, the master controller MC1 is configured to set the priority order PO in accordance with operational status information relating to operational status of at least one of the master wired communicator MD1, the slave wired communicator SD1, the master wireless communicator ML1, and the slave wireless communicator SL1. In this embodiment, the operational status information includes power supply information relating to status of power supply to at least one of the master wired communicator MD1, the slave wired communicator SD1, the master wireless communicator ML1, and the slave wireless communicator SL1.

The power supply information includes a voltage of electricity supplied from the electric power source PS and a remaining level of the electric power source ME1. The voltage of electricity supplied from the electric power source PS indicates the status of power supply to the master wired communicator MD1, the slave wired communicator SD1, the master wireless communicator ML1, and the slave wireless communicator SL1. The remaining level of the electric power source ME1 indicates the status of power supply to the master wired communicator MD1 and the master wireless communicator ML1. The status of power supply of the electric power source PS is abnormal due to disconnection of the electric wiring structure WS and/or breakdown of the electric power source PS if the voltage sensed by the power-supply sensor MV1 is equal to or lower than a predetermined voltage VP. The status of power supply of the electric power source ME1 is abnormal due to disconnection of wiring and/or breakdown of the electric power source ME1 if the remaining level sensed by the power-supply sensor MV1 is equal to or higher than a predetermined level L1.

The master controller MC1 is configured to set the priority order PO indicating that the wired communication channel is given priority over the wireless communication channel if the voltage sensed by the power-supply sensor MV1 is equal to or lower than the predetermined voltage VP and if the remaining level sensed by the power-supply sensor MV1 is equal to or higher than the predetermined level L1. The master controller MC1 is configured to control the memory MC12 to store the priority order PO which is newly set by the master controller MC1. The memory MC12 is configured to store the predetermined voltage VP and the predetermined level L1.

As seen in FIGS. 5 and 6, the master controller MC1 is configured to set the priority order PO in accordance with error information E1 including an error message transmitted by at least one of the master wired communicator MD1, the master wireless communicator ML1, the slave wired communicator SD1 or SD2, and the slave wireless communicator SL1 or SL2. In this embodiment, the master controller MC1 is configured to detect the error information E1 including an error occurring in each of the master wired communicator MD1 and the master wireless communicator ML1. The master controller MC1 is configured to set the priority order PO indicating that the wireless communication channel is given priority over the wired communication channel if the master controller MC1 detects the error information E1 occurring in the master wired communicator MD1. The master controller MC1 is configured to set the priority order PO indicating that the wired communication channel is given priority over the wireless communication channel if the master controller MC1 detects the error information E1 occurring in the master wireless communicator ML1. However, the master controller MC1 can be configured to set the priority order PO in accordance with the error information E1 including an error message transmitted by at least one of the slave wired communicators SD1 and SD2 and the slave wireless communicators SL1 and SL2.

Figure 8:
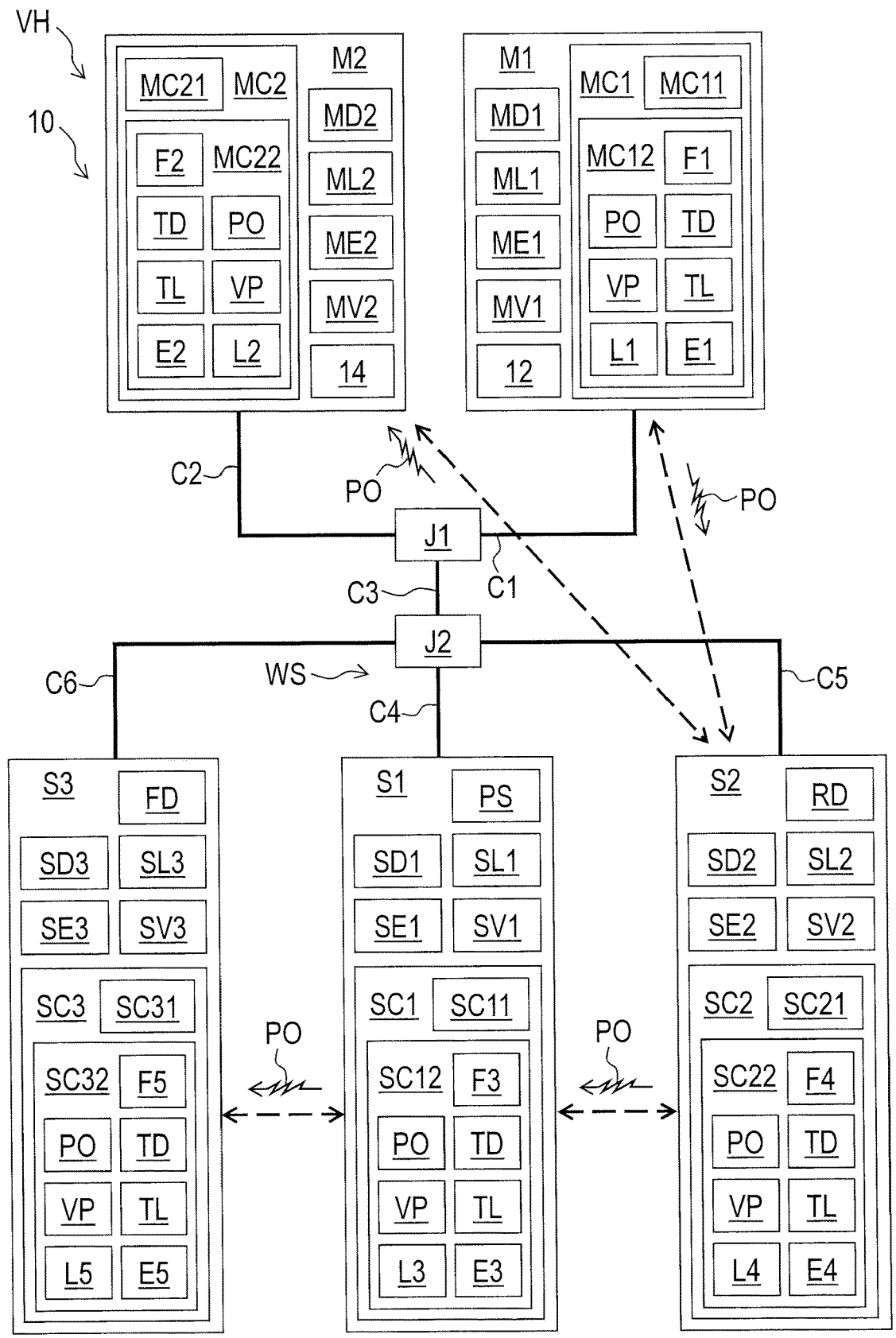
FIG. 8 is another schematic block diagram of the human-powered vehicle illustrated in FIG. 1 (transmission of a priority order via a wireless communication channel).
Figure 9:
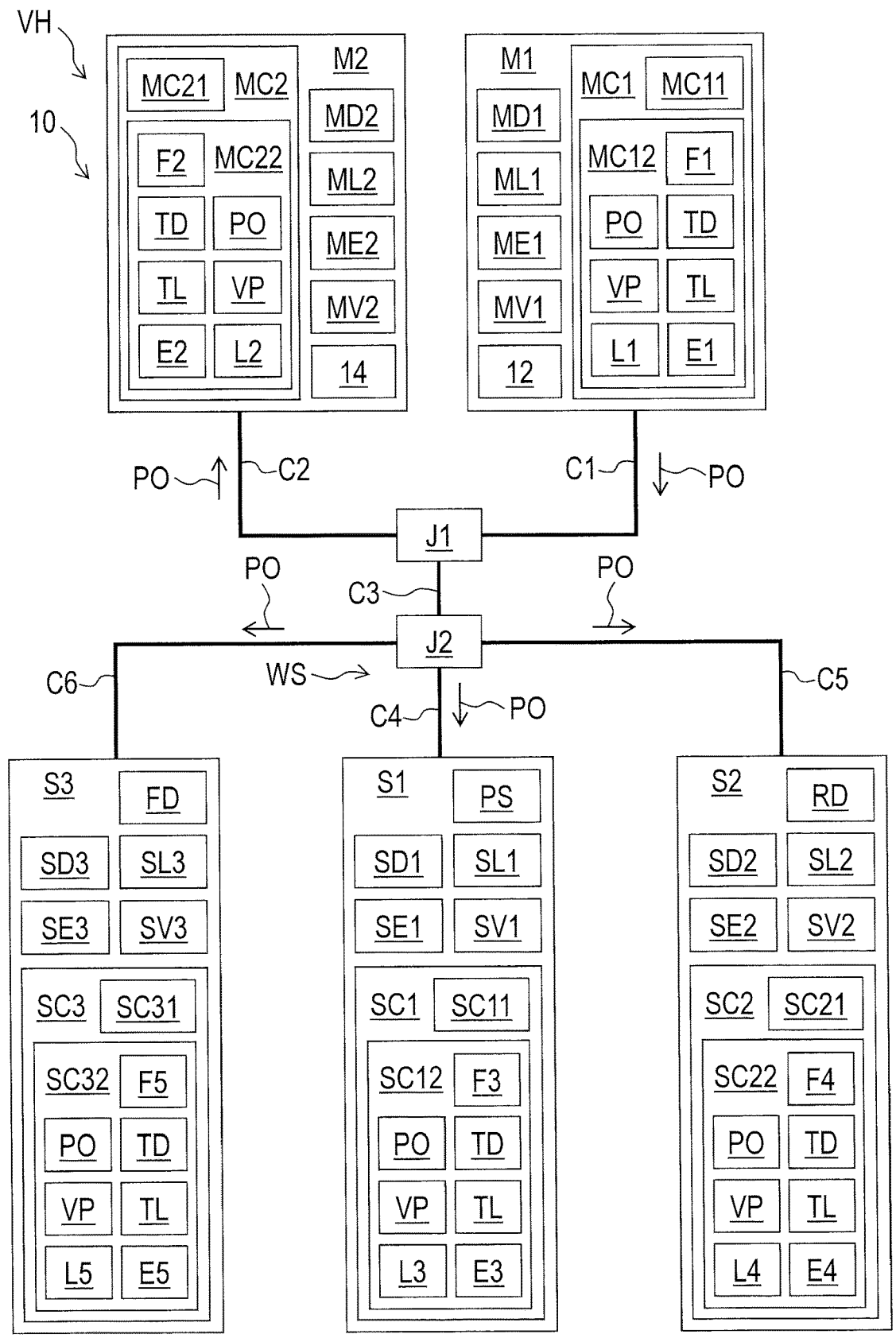
FIG. 9 is another schematic block diagram of the human-powered vehicle illustrated in FIG. 1 (transmission of the priority order via a wired communication channel).

As seen in FIGS. 8 and 9, the master controller MC1 is configured to transmit the priority order PO to one of the slave communication apparatuses S1 and S2 via one of the wired communication channel and the wireless communication channel based on the communication information, the operational status information, and/or the error information.

As seen in FIG. 8, the master controller MC1 is configured to transmit the priority order PO which is newly set by the master controller MC1 to the slave communication apparatus S2 via the wireless communication channel if the master controller MC1 newly sets the priority order PO indicating that the wireless communication channel is given priority over the wired communication channel. The slave controller SC2 is configured to transmit the priority order PO transmitted from the master communication apparatus M1 to the slave communication apparatus S1 and the master communication apparatus M2 via the wireless communication channel. The slave controller SC1 is configured to transmit the priority order PO transmitted from the slave communication apparatus S2 to the slave communication apparatus S3 via the wireless communication channel.

The slave controller SC2 is configured to control the memory SC22 to store the priority order PO transmitted from the master communication apparatus M1 if the slave controller SC1 receives the priority order PO via the wireless communication channel. The slave controller SC2 is configured to select the slave wireless communicator SL2 to transmit and receive signals via the wireless communication channel based on the priority order PO indicating that the wireless communication channel is given priority over the wired communication channel. As with the slave controller SC2, the master controller MC2 and the slave controllers SC1 and SC3 are configured to respectively control the memories MC22, SC12, and SC32 to store the priority order PO. The master controller MC2 and the slave controllers SC1 and SC3 are configured to select the master wireless communicator ML2 and the slave wireless communicators SL1 and SL3 based on the priority order PO indicating that the wireless communication channel is given priority over the wired communication channel.

As seen in FIG. 9, the master controller MC1 is configured to transmit the priority order PO which is newly set by the master controller MC1 to the master communication apparatus M2 and the slave communication apparatuses S1, S2, and S3 via the wired communication channel if the master controller MC1 newly sets the priority order PO indicating that the wired communication channel is given priority over the wireless communication channel. The master controller MC2 and the slave controllers SC1, SC2, and SC3 are configured to respectively control the memories MC22, SC12, SC22, and SC32 to store the priority order PO. The master controller MC2 and the slave controllers SC1, SC2, and SC3 are configured to select the master wireless communicator ML2 and the slave wireless communicators SL1, SL2, and SL3 based on the priority order PO.

The master controller MC2 has substantially the same algorithm as the algorithm of the master controller MC1 regarding the control based on the priority order PO and the setting and transmitting of the priority order PO. The description of the control based on the priority order PO and the setting and transmitting of the priority order PO in the master controller MC1 can be utilized as the description of the control based on the priority order PO and the setting and transmitting of the priority order PO in the master controller MC2 by replacing "M1," "MC1," "MC12," "MV1," "TP11," "TP12," "TP13," "L1," and "E1" with "M2," "MC2," "MC22," "MV2," "TP21," "TP22," "TP23," "L2," and "E2" Thus, they will not be described in detail here for the sake of brevity.

As seen in FIGS. 5 and 6, the slave controller SC1 is configured to control the slave wired communicator SD1 and the slave wireless communicator SL1 in accordance with the priority order PO. As seen in FIG. 5, the slave controller SC1 is configured to control the slave wired communicator SD1 to transmit and receive signals via the wired communication channel in accordance with the priority order PO indicating that the wired communication channel is given priority over the wireless communication channel. As seen in FIG. 6, the slave controller SC1 is configured to control the slave wireless communicator SL1 to transmit and receive signals via the wireless communication channel in accordance with the priority order PO indicating that the wireless communication channel is given priority over the wired communication channel.

Figure 10:
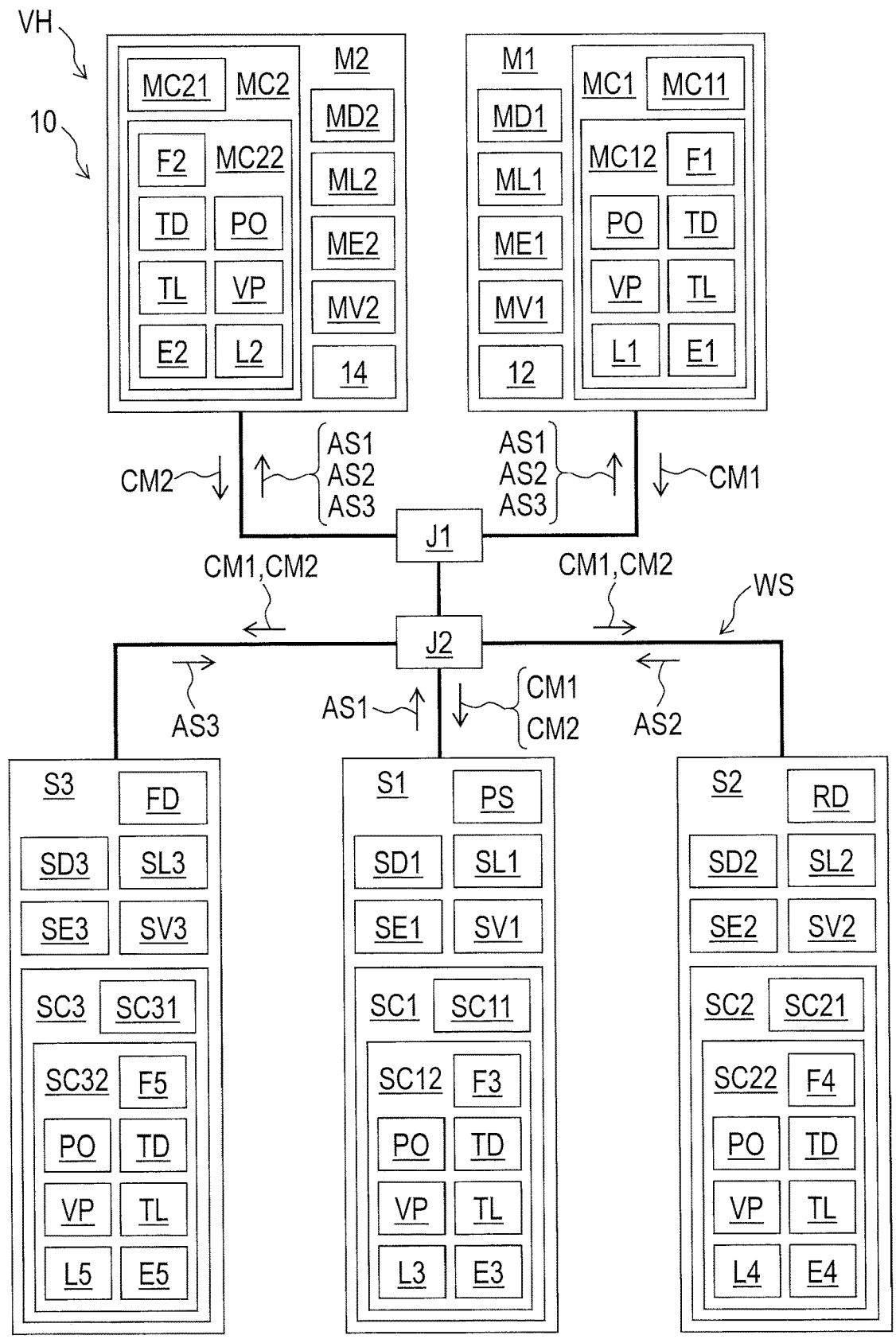
FIG. 10 is another schematic block diagram of the human-powered vehicle illustrated in FIG. 1 (the wired communication).

As seen in FIG. 10, the slave controller SC1 is configured to set the priority order PO in accordance with information relating to the master communication apparatus M1 or M2 and the slave communication apparatus S1. In this embodiment, the slave controller SC1 is configured to set the priority order PO in accordance with communication information relating to the communication between the master communication apparatus M1 or M2 and the slave communication apparatus S1.

The communication information relates to communication between the master wired communicator MD1 or MD2 and the slave wired communicator SD1. The communication information includes a confirmation signal CM1 and/or CM2 transmitted from the master communication apparatus M1 and/or M2 via the wired communication channel.

The master controller MC1 is configured to control the master wired communicator MD1 to transmit the confirmation signal CM1 to the slave communication apparatus S1 via the wired communication channel at regular intervals. The master controller MC2 is configured to control the master wired communicator MD2 to transmit the confirmation signal CM2 to the slave communication apparatus S1 via the wired communication channel at regular intervals. The slave controller SC1 is configured to control the slave wired communicator SD1 to transmit the acknowledgement signal AS1 to the master communication apparatus M1 or M2 via the wired communication channel if the slave controller SC1 receives the confirmation signal CM1 or CM2 from the master communication apparatus M1 or M2 via the wired communication channel.

The slave controller SC1 is configured to measure a time period TP3 from previous receipt of the confirmation signal CM1 or CM2 from the master communication apparatus M1 or M2 via the wired communication channel to next receipt of the confirmation signal CM1 or CM2 from the master communication apparatus M1 or M2 via the wired communication channel. The slave controller SC1 is configured to compare the time period TP3 with the reference wired time period TD if the slave controller SC1 receives the confirmation signal CM1 or CM2 via the wired communication channel. The slave controller SC1 is configured to conclude that the wired communication is normal between the master communication apparatus M1 and the slave communication apparatus S1 if the time period TP3 is equal to or shorter than the reference wired time period TD. The slave controller SC1 is configured to conclude that the wired communication is abnormal between the master communication apparatus M1 and the slave communication apparatus S1 if the time period TP3 exceeds the reference wired time period TD.

The master controller MC1 is configured to measure the time period TP11 from the transmission of the confirmation signal CM1 via the wired communication channel to receipt of the acknowledgement signal AS1 from the slave communication apparatus S1 via the wired communication channel. The master controller MC1 is configured to compare the time period TP11 with the reference wired time period TD if the master controller MC1 receives the acknowledgement signal AS1 via the wired communication channel. The master controller MC1 is configured to conclude that the wired communication is normal between the master communication apparatus M1 and the slave communication apparatus S1 if the time period TP11 is equal to or shorter than the reference wired time period TD. The master controller MC1 is configured to conclude that the wired communication is abnormal between the master communication apparatus M1 and the slave communication apparatus S1 if the time period TP11 exceeds the reference wired time period TD.

The master controller MC2 has substantially the same algorithm as the algorithm of the master controller MC1 regarding the control based on the time periods T11, TP12, and TP13. The description of the control based on the time periods T11, TP12, and TP13 in the master controller MC1 can be utilized as the description of the control based on the time periods T21, TP22, and TP23 in the master controller MC2 by replacing "M1," "MC1," "MD1," "TP11," "TP12," and "TP13" with "M2," "MC2," "MD2," "TP21," "TP22," and "TP23." Thus, they will not be described in detail here for the sake of brevity.

As seen in FIGS. 5 and 6, the slave controller SC1 is configured to set the priority order PO in accordance with operational status information relating to operational status of at least one of the master wired communicator MD1, the slave wired communicator SD1, the master wireless communicator ML1, and the slave wireless communicator SL1. In this embodiment, the operational status information includes power supply information relating to status of power supply to at least one of the master wired communicator MD1, the slave wired communicator SD1, the master wireless communicator ML1, and the slave wireless communicator SL1.

The power supply information includes a remaining level of the electric power source PS. The remaining level of the electric power source PS indicates the status of power supply to the slave wired communicator SD1 and the slave wireless communicator SL1. The status of power supply of the electric power source PS is abnormal due to disconnection of wiring and/or breakdown of the electric power source PS if the remaining level sensed by the power-supply sensor SV1 is equal to or higher than a predetermined level L3.

The slave controller SC1 is configured to set the priority order PO indicating that the wired communication channel is given priority over the wireless communication channel if the remaining level sensed by the power-supply sensor SV1 is equal to or higher than the predetermined level L3. The slave controller SC1 is configured to control the memory SC12 to store the priority order PO which is newly set by the slave controller SC1. The memory SC12 is configured to store the predetermined level L3.

The slave controller SC1 is configured to set the priority order PO in accordance with error information E3 includes an error message transmitted by at least one of the master wired communicator MD1 or MD2, the master wireless communicator ML1 or ML2, the slave wired communicator SD1, and the slave wireless communicator SL1. In this embodiment, the slave controller SC1 is configured to detect the error information E3 including an error occurring in each of the slave wired communicator SD1 and the slave wireless communicator SL1. The slave controller SC1 is configured to set the priority order PO indicating that the wireless communication channel is given priority over the wired communication channel if the slave controller SC1 detects the error information E3 occurring in the slave wired communicator SD1. The slave controller SC1 is configured to set the priority order PO indicating that the wired communication channel is given priority over the wireless communication channel if the slave controller SC1 detects the error information E3 occurring in the slave wireless communicator SL1. However, the slave controller SC1 can be configured to set the priority order PO in accordance with the error information E3 including an error message transmitted by at least one of the slave wired communicators SD1 and SD2 and the slave wireless communicators SL1 and SL2.

Figure 11:
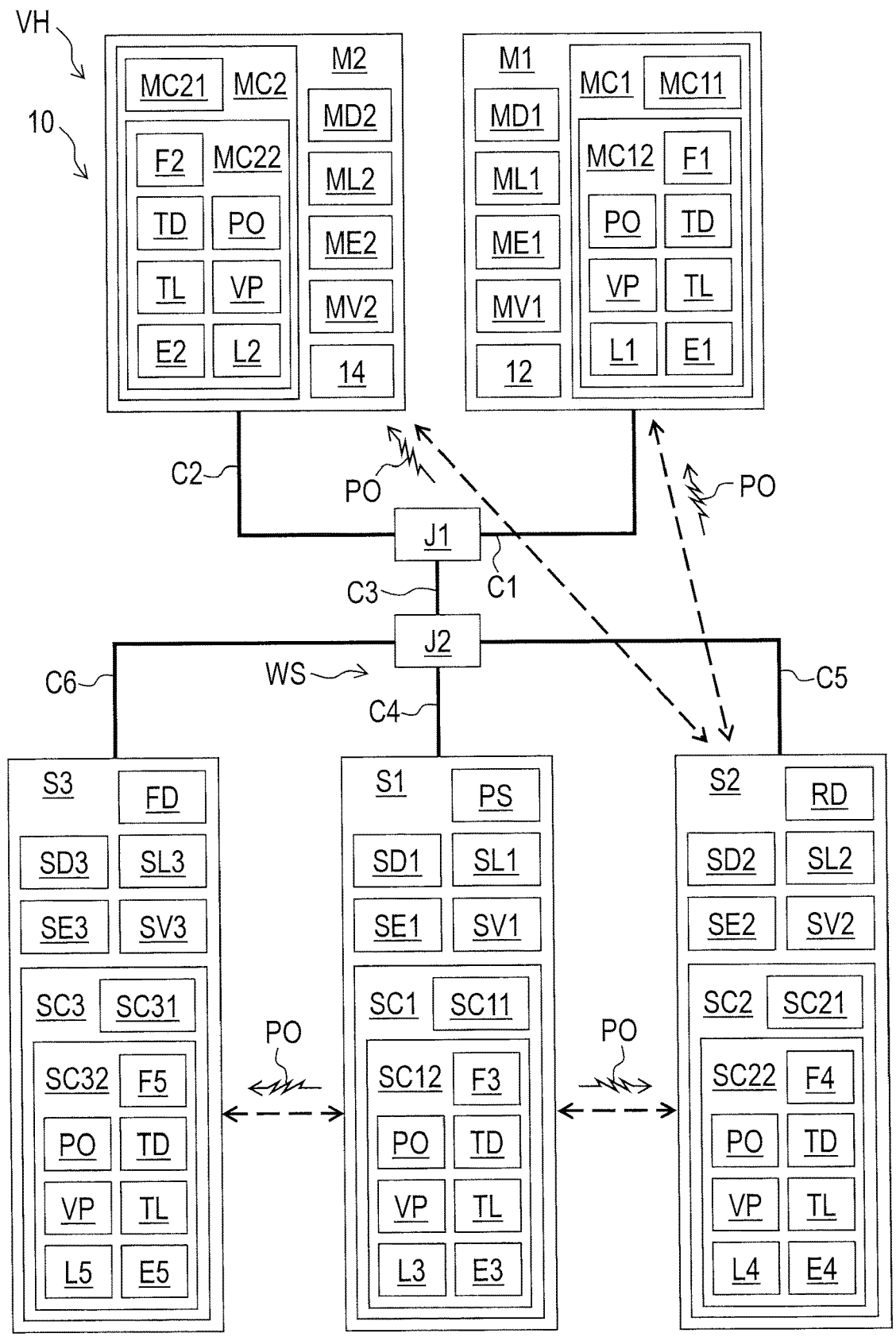
FIG. 11 is another schematic block diagram of the human-powered vehicle illustrated in FIG. 1 (transmission of the priority order via the wireless communication channel).
Figure 12:
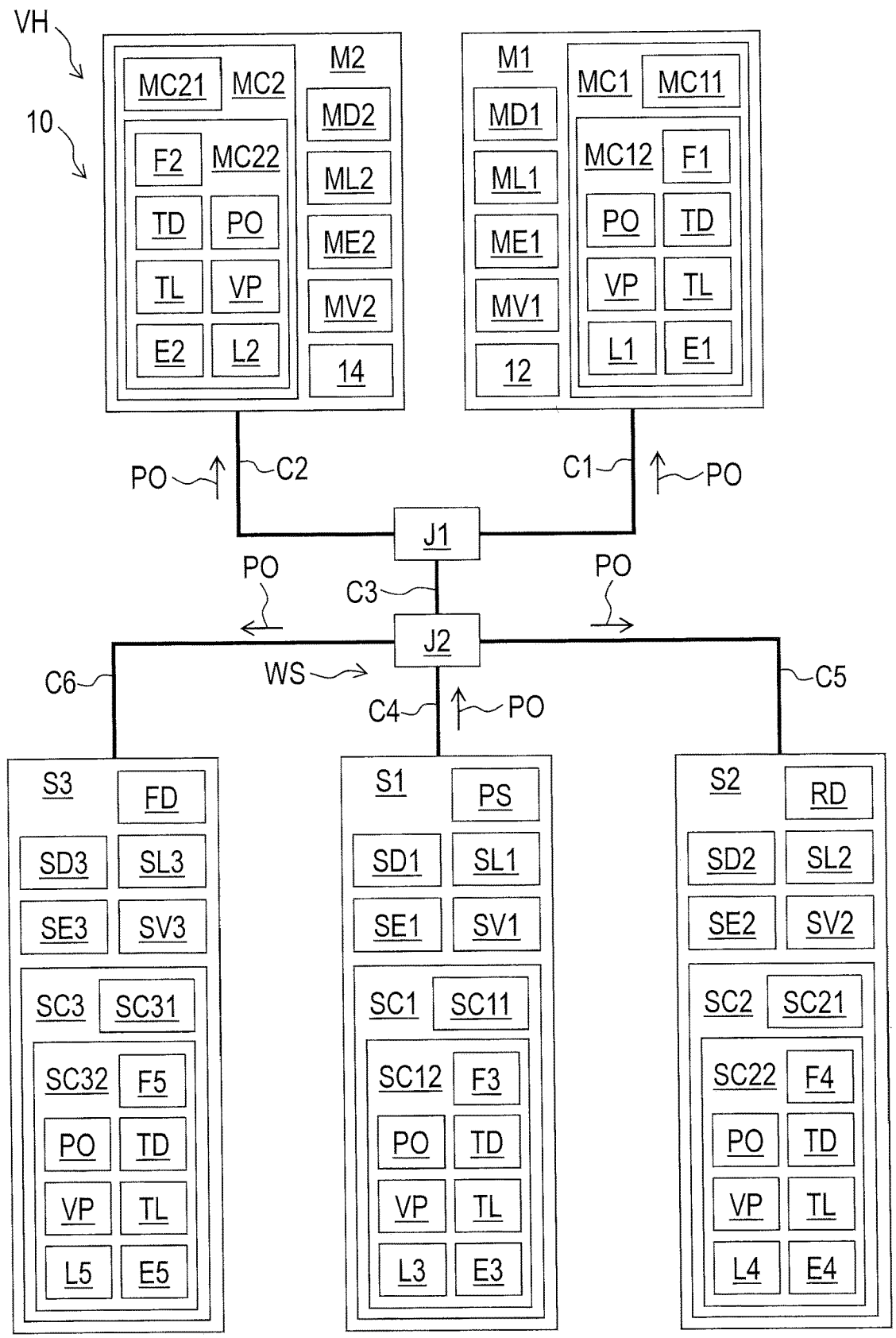
FIG. 12 is another schematic block diagram of the human-powered vehicle illustrated in FIG. 1 (transmission of the priority order via the wired communication channel).

As seen in FIGS. 11 and 12, the slave controller SC1 is configured to transmit the priority order PO to the master communication apparatus M1 and/or M2 via one of the wired communication channel and the wireless communication channel based on the communication information, the operational status information, and/or the error information.

As seen in FIG. 11, the slave controller SC1 is configured to transmit the priority order PO which is newly set by the slave controller SC1 to the slave communication apparatuses S2 and S3 via the wireless communication channel if the slave controller SC1 newly sets the priority order PO indicating that the wireless communication channel is given priority over the wired communication channel. The slave controller SC2 is configured to transmit the priority order PO transmitted from the slave communication apparatus S1 to the master communication apparatuses M1 and M2 via the wireless communication channel.

As seen in FIG. 12, the slave controller SC1 is configured to transmit the priority order PO which is newly set by the slave controller SC1 to the master communication apparatuses M1 and M2 and the slave communication apparatuses S2 and S3 via the wired communication channel if the slave controller SC1 newly sets the priority order PO indicating that the wired communication channel is given priority over the wireless communication channel.

The slave controller SC2 is configured to control the memory SC22 to store the priority order PO transmitted from the slave communication apparatus S1. The slave controller SC2 is configured to select the slave wireless communicator SL2 to transmit and receive signals via the wireless communication channel if the priority order PO transmitted from the slave communication apparatus S1 indicates that the wireless communication channel is given priority over the wired communication channel. The slave controller SC2 is configured to select the slave wired communicator SD2 to transmit and receive signals via the wired communication channel if the priority order PO transmitted from the slave communication apparatus S1 indicates that the wired communication channel is given priority over the wireless communication channel. As with the slave controller SC2, the master controllers MSC1 and MC2 and the slave controller SC3 are configured to respectively control the memories MC12, MC22, and SC32 to store the priority order PO. The master controllers MC1 and MC2 and the slave controller SC3 are configured to select the master wireless communicators ML1 and ML2 and the slave wireless communicator SL3 based on the priority order PO.

As seen in FIGS. 5 and 6, the slave controller SC2 is configured to control the slave wired communicator SD2 and the slave wireless communicator SL2 in accordance with the priority order PO. As seen in FIG. 5, the slave controller SC2 is configured to control the slave wired communicator SD2 to transmit and receive signals via the wired communication channel in accordance with the priority order PO indicating that the wired communication channel is given priority over the wireless communication channel. As seen in FIG. 6, the slave controller SC2 is configured to control the slave wireless communicator SL2 to transmit and receive signals via the wireless communication channel in accordance with the priority order PO indicating that the wireless communication channel is given priority over the wired communication channel.

Figure 13:
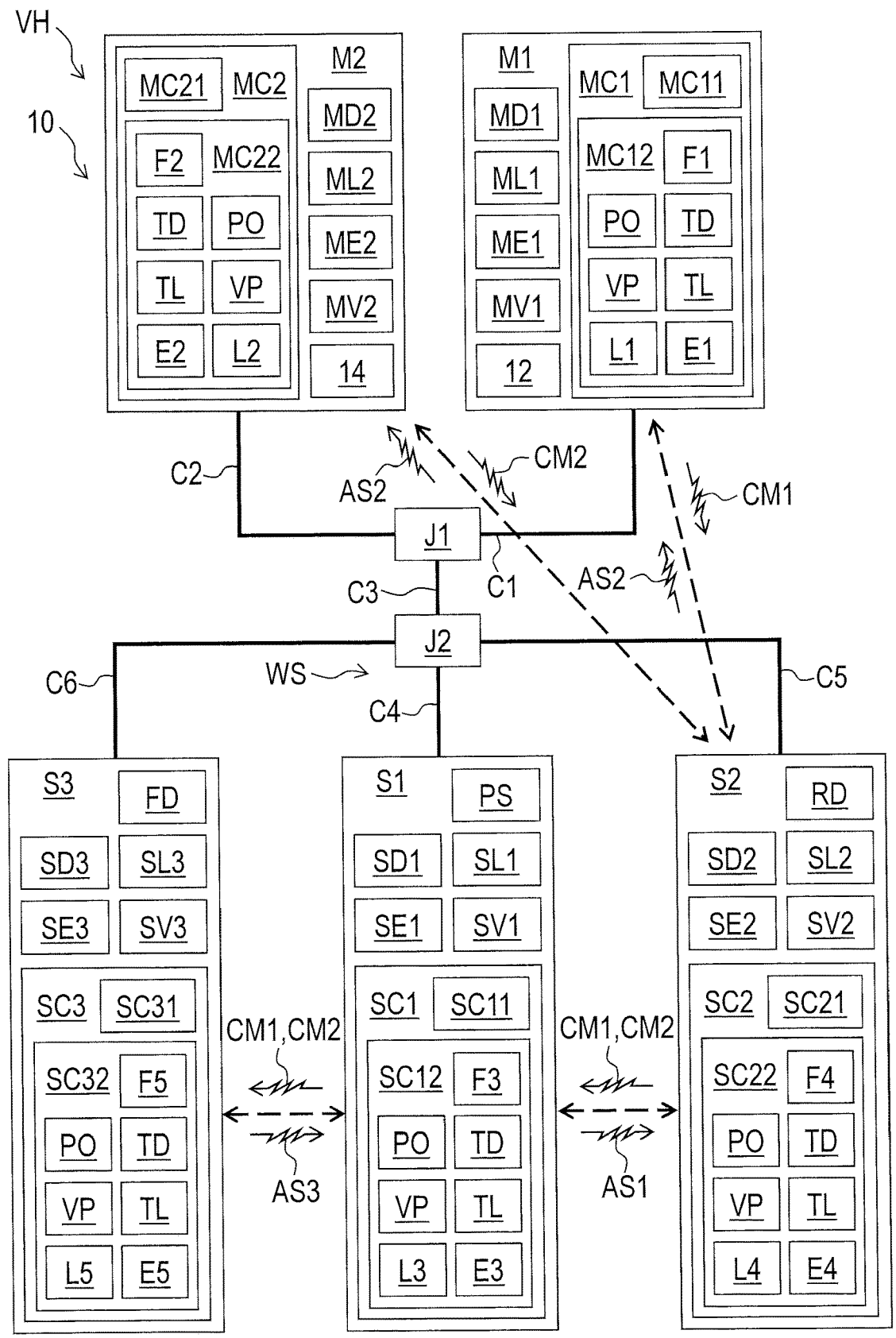
FIG. 13 is another schematic block diagram of the human-powered vehicle illustrated in FIG. 1 (transmission of an acknowledgement signal via the wireless communication channel).

As seen in FIGS. 10 and 13, the slave controller SC2 is configured to set the priority order PO in accordance with information relating to the master communication apparatus M1 or M2 and the slave communication apparatus S2. In this embodiment, the slave controller SC2 is configured to set the priority order PO in accordance with communication information relating to the communication between the master communication apparatus M1 or M2 and the slave communication apparatus S2.

As seen in FIG. 10, the communication information relates to communication between the master wired communicator MD1 or MD2 and the slave wired communicator SD2. The communication information includes a confirmation signal CM1 and/or CM2 transmitted from the master communication apparatus M1 and/or M2 via the wired communication channel.

The master controller MC1 is configured to control the master wired communicator MD1 to transmit the confirmation signal CM1 to the slave communication apparatus S2 via the wired communication channel at regular intervals. The master controller MC2 is configured to control the master wired communicator MD2 to transmit the confirmation signal CM2 to the slave communication apparatus S2 via the wired communication channel at regular intervals. The slave controller SC2 is configured to control the slave wired communicator SD2 to transmit the acknowledgement signal AS2 to the master communication apparatus M1 or M2 via the wired communication channel if the slave controller SC2 receives the confirmation signal CM1 or CM2 from the master communication apparatus M1 or M2 via the wired communication channel.

The slave controller SC2 is configured to measure a time period TP4 from previous receipt of the confirmation signal CM1 or CM2 from the master communication apparatus M1 or M2 via the wired communication channel to next receipt of the confirmation signal CM1 or CM2 from the master communication apparatus M1 or M2 via the wired communication channel. The slave controller SC2 is configured to compare the time period TP4 with the reference wired time period TD if the slave controller SC2 receives the confirmation signal CM1 or CM2 via the wired communication channel. The slave controller SC2 is configured to conclude that the wired communication is normal between the master communication apparatus M1 and the slave communication apparatus S2 if the time period TP4 is equal to or shorter than the reference wired time period TD. The slave controller SC2 is configured to conclude that the wired communication is abnormal between the master communication apparatus M1 and the slave communication apparatus S2 if the time period TP4 exceeds the reference wired time period TD.

The master controller MC1 is configured to measure the time period TP12 from the transmission of the confirmation signal CM1 via the wired communication channel to receipt of the acknowledgement signal AS2 from the slave communication apparatus S2 via the wired communication channel. The master controller MC1 is configured to compare the time period TP12 with the reference wired time period TD if the master controller MC1 receives the acknowledgement signal AS2 via the wired communication channel. The master controller MC1 is configured to conclude that the wired communication is normal between the master communication apparatus M1 and the slave communication apparatus S2 if the time period TP12 is equal to or shorter than the reference wired time period TD. The master controller MC1 is configured to conclude that the wired communication is abnormal between the master communication apparatus M1 and the slave communication apparatus S2 if the time period TP12 exceeds the reference wired time period TD.

The master controller MC2 is configured to measure the time period TP22 from the transmission of the confirmation signal CM2 via the wired communication channel to receipt of the acknowledgement signal AS2 from the slave communication apparatus S2 via the wired communication channel. The master controller MC2 is configured to compare the time period TP22 with the reference wired time period TD if the master controller MC2 receives the acknowledgement signal AS2 via the wired communication channel. The master controller MC2 is configured to conclude that the wired communication is normal between the master communication apparatus M1 and the slave communication apparatus S2 if the time period TP22 is equal to or shorter than the reference wired time period TD. The master controller MC2 is configured to conclude that the wired communication is abnormal between the master communication apparatus M1 and the slave communication apparatus S2 if the time period TP22 exceeds the reference wired time period TD.

As seen in FIG. 13, the communication information relates to communication between the master wireless communicator ML1 or ML2 and the slave wireless communicator SL2. The communication information includes the confirmation signal CM1 and/or CM2 transmitted from the master communication apparatus M1 and/or M2 via the wireless communication channel.

The master controller MC1 is configured to control the master wireless communicator ML1 to transmit the confirmation signal CM1 to the slave communication apparatus S2 via the wireless communication channel at regular intervals. The master controller MC2 is configured to control the master wireless communicator ML2 to transmit the confirmation signal CM2 to the slave communication apparatus S2 via the wireless communication channel at regular intervals such as 1 min. The slave controller SC2 is configured to control the slave wireless communicator SL2 to transmit the acknowledgement signal AS2 to the master communication apparatus M1 or M2 via the wireless communication channel if the slave controller SC2 receives the confirmation signal CM1 or CM2 from the master communication apparatus M1 or M2 via the wireless communication channel.

The slave controller SC2 is configured to measure a time period TP4 from previous receipt of the confirmation signal CM1 or CM2 from the master communication apparatus M1 or M2 via the wireless communication channel to next receipt of the confirmation signal CM1 or CM2 from the master communication apparatus M1 or M2 via the wireless communication channel. The slave controller SC2 is configured to compare the time period TP4 with the reference wireless time period TL if the slave controller SC2 receives the confirmation signal CM1 or CM2 via the wireless communication channel. The slave controller SC2 is configured to conclude that the wireless communication is normal between the master communication apparatus M1 and the slave communication apparatus S2 if the time period TP4 is equal to or shorter than the reference wireless time period TL. The slave controller SC2 is configured to conclude that the wireless communication is abnormal between the master communication apparatus M1 and the slave communication apparatus S2 if the time period TP4 exceeds the reference wireless time period TL.

The master controller MC1 is configured to measure the time period TP12 from the transmission of the confirmation signal CM1 via the wireless communication channel to receipt of the acknowledgement signal AS2 from the slave communication apparatus S2 via the wireless communication channel. The master controller MC1 is configured to compare the time period TP12 with the reference wireless time period TL if the master controller MC1 receives the acknowledgement signal AS2 via the wireless communication channel. The master controller MC1 is configured to conclude that the wireless communication is normal between the master communication apparatus M1 and the slave communication apparatus S2 if the time period TP12 is equal to or shorter than the reference wireless time period TL. The master controller MC1 is configured to conclude that the wireless communication is abnormal between the master communication apparatus M1 and the slave communication apparatus S2 if the time period TP12 exceeds the reference wireless time period TL.

The master controller MC2 is configured to measure the time period TP22 from the transmission of the confirmation signal CM2 via the wireless communication channel to receipt of the acknowledgement signal AS2 from the slave communication apparatus S2 via the wireless communication channel. The master controller MC2 is configured to compare the time period TP22 with the reference wireless time period TL if the master controller MC2 receives the acknowledgement signal AS2 via the wireless communication channel. The master controller MC2 is configured to conclude that the wireless communication is normal between the master communication apparatus M1 and the slave communication apparatus S2 if the time period TP22 is equal to or shorter than the reference wireless time period TL. The master controller MC2 is configured to conclude that the wireless communication is abnormal between the master communication apparatus M1 and the slave communication apparatus S2 if the time period TP22 exceeds the reference wireless time period TL.

The slave controller SC2 is configured to control the slave wireless communicator SL2 to transmit the confirmation signal CM4 to the slave communication apparatus S1 via the wireless communication channel at regular intervals. The slave controller SC1 is configured to control the slave wireless communicator SL2 to transmit the acknowledgement signal AS1 to the slave communication apparatus S2 via the wireless communication channel if the slave controller SC1 receives the confirmation signal CM4 from the slave communication apparatus S2 via the wireless communication channel.

The slave controller SC1 is configured to measure the time period TP3 from previous receipt of the confirmation signal CM4 from the slave communication apparatus S2 via the wireless communication channel to next receipt of the confirmation signal CM4 from the slave communication apparatus S2 via the wireless communication channel. The slave controller SC1 is configured to compare the time period TP3 with the reference wireless time period TL if the slave controller SC1 receives the confirmation signal CM4 via the wireless communication channel. The slave controller SC1 is configured to conclude that the wireless communication is normal between the slave communication apparatuses S1 and S2 if the time period TP3 is equal to or shorter than the reference wireless time period TL. The slave controller SC1 is configured to conclude that the wireless communication is abnormal between the slave communication apparatuses S1 and S2 if the time period TP3 exceeds the reference wireless time period TL.

The slave controller SC2 is configured to measure the time period TP4 from the transmission of the confirmation signal CM4 via the wireless communication channel to receipt of the acknowledgement signal AS1 from the slave communication apparatus S1 via the wireless communication channel. The slave controller SC2 is configured to compare the time period TP4 with the reference wireless time period TL if the slave controller SC2 receives the acknowledgement signal AS1 via the wireless communication channel. The slave controller SC2 is configured to conclude that the wireless communication is normal between the slave communication apparatuses S1 and S2 if the time period TP4 is equal to or shorter than the reference wireless time period TL. The slave controller SC2 is configured to conclude that the wireless communication is abnormal between the slave communication apparatuses S1 and S2 if the time period TP4 exceeds the reference wireless time period TL.

As seen in FIGS. 5 and 6, the slave controller SC2 is configured to set the priority order PO in accordance with operational status information relating to operational status of at least one of the master wired communicator MD1, the slave wired communicator SD2, the master wireless communicator ML1, and the slave wireless communicator SL2. In this embodiment, the operational status information includes power supply information relating to status of power supply to at least one of the master wired communicator MD1, the slave wired communicator SD2, the master wireless communicator ML1, and the slave wireless communicator SL2.

The power supply information includes the voltage of electricity supplied from the electric power source PS and a remaining level of the electric power source SE2. The voltage of electricity supplied from the electric power source PS indicates the status of power supply to the slave wired communicator SD2 and the slave wireless communicator SL2. The remaining level of the electric power source SE2 indicates the status of power supply to the slave wired communicator SD2 and the slave wireless communicator SL2. The status of power supply of the electric power source PS is abnormal due to disconnection of the electric wiring structure WS and/or breakdown of the electric power source PS if the voltage sensed by the power-supply sensor SV2 is equal to or lower than a predetermined voltage. The status of power supply of the electric power source SE2 is abnormal due to disconnection of wiring and/or breakdown of the electric power source SE2 if the remaining level sensed by the power-supply sensor SV2 is equal to or higher than a predetermined level L4.

The slave controller SC2 is configured to set the priority order PO indicating that the wired communication channel is given priority over the wireless communication channel if the voltage sensed by the power-supply sensor SV2 is equal to or lower than the predetermined voltage VP and if the remaining level sensed by the power-supply sensor SV2 is equal to or higher than the predetermined level L4. The slave controller SC2 is configured to control the memory SC22 to store the priority order PO which is newly set by the slave controller SC2. The memory SC22 is configured to store the predetermined voltage VP and the predetermined level L4.

As seen in FIGS. 5 and 6, the slave controller SC2 is configured to set the priority order PO in accordance with error information E4 includes an error message transmitted by at least one of the master wired communicator MD1 or MD2, the master wireless communicator ML1 or ML2, the slave wired communicator SD2, and the slave wireless communicator SL2. In this embodiment, the slave controller SC2 is configured to detect the error information E4 including an error occurring in each of the slave wired communicator SD2 and the slave wireless communicator SL2. The slave controller SC2 is configured to set the priority order PO indicating that the wireless communication channel is given priority over the wired communication channel if the slave controller SC2 detects the error information E4 occurring in the slave wired communicator SD2. The slave controller SC2 is configured to set the priority order PO indicating that the wired communication channel is given priority over the wireless communication channel if the slave controller SC2 detects the error information E4 occurring in the slave wireless communicator SL2. However, the slave controller SC2 can be configured to set the priority order PO in accordance with the error information E4 including an error message transmitted by at least one of the slave wired communicators SD2 and SD2 and the slave wireless communicators SL2 and SL2.

Figure 14:
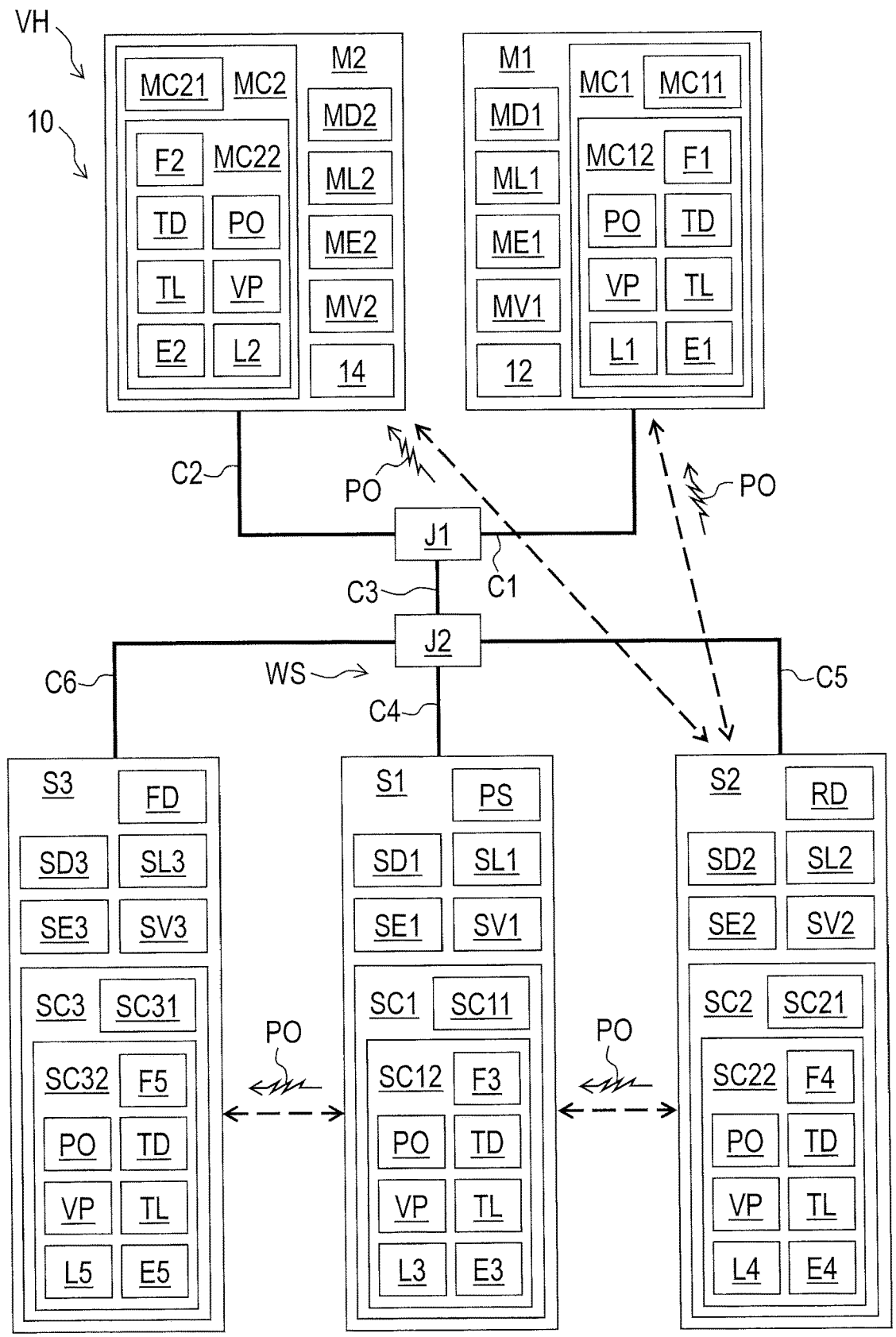
FIG. 14 is another schematic block diagram of the human-powered vehicle illustrated in FIG. 1 (transmission of the priority order via the wireless communication channel).
Figure 15:
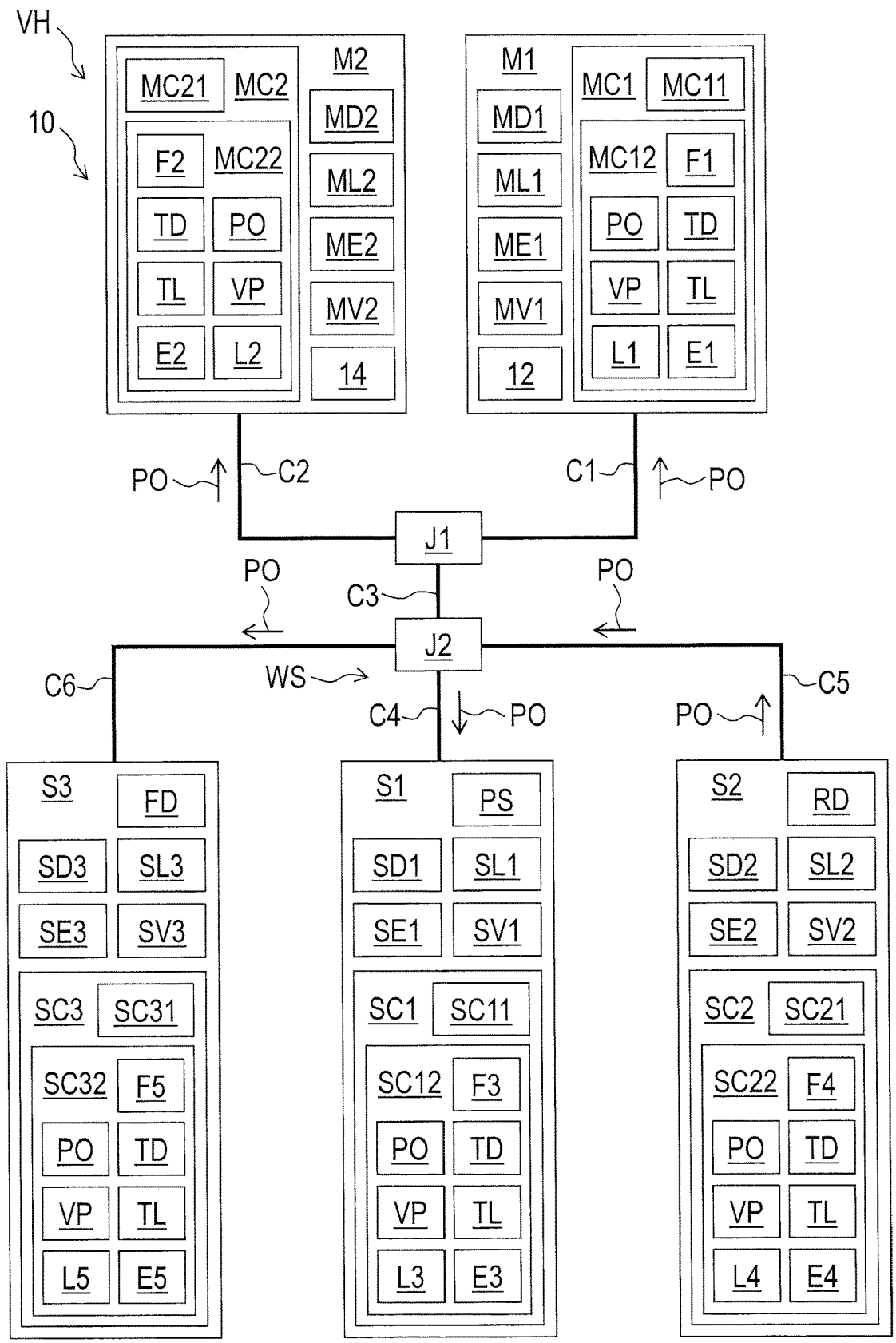
FIG. 15 is another schematic block diagram of the human-powered vehicle illustrated in FIG. 1 (transmission of the priority order via the wired communication channel).

As seen in FIGS. 14 and 15, the slave controller SC2 is configured to transmit the priority order PO to the master communication apparatus M1 and/or M2 via one of the wired communication channel and the wireless communication channel based on the communication information, the operational status information, and/or the error information.

As seen in FIG. 14, the slave controller SC2 is configured to transmit the priority order PO which is newly set by the slave controller SC2 to the master communication apparatuses M1 and M2 and the slave communication apparatus S1 via the wireless communication channel if the slave controller SC2 newly sets the priority order PO indicating that the wireless communication channel is given priority over the wired communication channel. The slave controller SC1 is configured to transmit the priority order PO transmitted from the slave communication apparatus S2 to the slave communication apparatus S3 via the wireless communication channel.

As seen in FIG. 15, the slave controller SC2 is configured to transmit the priority order PO which is newly set by the slave controller SC2 to the master communication apparatuses M1 and M2 and the slave communication apparatuses S2 and S3 via the wired communication channel if the slave controller SC2 newly sets the priority order PO indicating that the wired communication channel is given priority over the wireless communication channel.

As seen in FIGS. 5 and 6, the slave controller SC3 is configured to control the slave wired communicator SD3 and the slave wireless communicator SL3 in accordance with the priority order PO. As seen in FIG. 5, the slave controller SC3 is configured to control the slave wired communicator SD3 to transmit and receive signals via the wired communication channel in accordance with the priority order PO indicating that the wired communication channel is given priority over the wireless communication channel. As seen in FIG. 6, the slave controller SC3 is configured to control the slave wireless communicator SL3 to transmit and receive signals via the wireless communication channel in accordance with the priority order PO indicating that the wireless communication channel is given priority over the wired communication channel.

As seen in FIGS. 10 and 13, the slave controller SC3 is configured to set the priority order PO in accordance with information relating to the master communication apparatus M1 or M2 and the slave communication apparatus S3. In this embodiment, the slave controller SC3 is configured to set the priority order PO in accordance with communication information relating to the communication between the master communication apparatus M1 or M2 and the slave communication apparatus S3.

As seen in FIG. 10, the communication information relates to communication between the master wired communicator MD1 or MD2 and the slave wired communicator SD3. The communication information includes the confirmation signal CM1 and/or CM2 transmitted from the master communication apparatus M1 and/or M2 via the wired communication channel.

The master controller MC1 is configured to control the master wired communicator MD1 to transmit the confirmation signal CM1 to the slave communication apparatus S3 via the wired communication channel at regular intervals. The master controller MC2 is configured to control the master wired communicator MD2 to transmit the confirmation signal CM2 to the slave communication apparatus S3 via the wired communication channel at regular intervals. The slave controller SC3 is configured to control the slave wired communicator SD3 to transmit the acknowledgement signal AS3 to the master communication apparatus M1 or M2 via the wired communication channel if the slave controller SC3 receives the confirmation signal CM1 or CM2 from the master communication apparatus M1 or M2 via the wired communication channel.

The slave controller SC3 is configured to measure the time period TP4 from previous receipt of the confirmation signal CM1 or CM2 from the master communication apparatus M1 or M2 via the wired communication channel to next receipt of the confirmation signal CM1 or CM2 from the master communication apparatus M1 or M2 via the wired communication channel. The slave controller SC3 is configured to compare the time period TP4 with the reference wired time period TD if the slave controller SC3 receives the confirmation signal CM1 or CM2 via the wired communication channel. The slave controller SC3 is configured to conclude that the wired communication is normal between the master communication apparatus M1 and the slave communication apparatus S3 if the time period TP4 is equal to or shorter than the reference wired time period TD. The slave controller SC3 is configured to conclude that the wired communication is abnormal between the master communication apparatus M1 and the slave communication apparatus S3 if the time period TP4 exceeds the reference wired time period TD.

The master controller MC1 is configured to measure the time period TP13 from the transmission of the confirmation signal CM1 via the wired communication channel to receipt of the acknowledgement signal AS3 from the slave communication apparatus S3 via the wired communication channel. The master controller MC1 is configured to compare the time period TP13 with the reference wired time period TD if the master controller MC1 receives the acknowledgement signal AS3 via the wired communication channel. The master controller MC1 is configured to conclude that the wired communication is normal between the master communication apparatus M1 and the slave communication apparatus S3 if the time period TP13 is equal to or shorter than the reference wired time period TD. The master controller MC1 is configured to conclude that the wired communication is abnormal between the master communication apparatus M1 and the slave communication apparatus S3 if the time period TP13 exceeds the reference wired time period TD.

The master controller MC2 is configured to measure the time period TP23 from the transmission of the confirmation signal CM2 via the wired communication channel to receipt of the acknowledgement signal AS3 from the slave communication apparatus S3 via the wired communication channel. The master controller MC2 is configured to compare the time period TP23 with the reference wired time period TD if the master controller MC2 receives the acknowledgement signal AS3 via the wired communication channel. The master controller MC2 is configured to conclude that the wired communication is normal between the master communication apparatus M1 and the slave communication apparatus S3 if the time period TP23 is equal to or shorter than the reference wired time period TD. The master controller MC2 is configured to conclude that the wired communication is abnormal between the master communication apparatus M1 and the slave communication apparatus S3 if the time period TP23 exceeds the reference wired time period TD.

As seen in FIG. 13, the communication information relates to communication between the master wireless communicator ML1 or ML2 and the slave wireless communicator SL3. The communication information includes the confirmation signal CM1 and/or CM2 transmitted from the master communication apparatus M1 and/or M2 via the wireless communication channel.

The slave controller SC1 is configured to control the slave wireless communicator SL1 to transmit the confirmation signal CM5 to the slave communication apparatus S3 via the wireless communication channel at regular intervals. The slave controller SC3 is configured to control the slave wireless communicator SL3 to transmit the acknowledgement signal AS3 to the slave communication apparatus S1 via the wireless communication channel if the slave controller SC3 receives the confirmation signal CM5 from the slave communication apparatus S1 via the wireless communication channel.

The slave controller SC3 is configured to measure a time period TP5 from previous receipt of the confirmation signal CM5 from the slave communication apparatus S1 via the wireless communication channel to next receipt of the confirmation signal CM5 from the slave communication apparatus S1 via the wireless communication channel. The slave controller SC3 is configured to compare the time period TP5 with the reference wireless time period TL if the slave controller SC3 receives the confirmation signal CM5 via the wireless communication channel. The slave controller SC3 is configured to conclude that the wireless communication is normal between the slave communication apparatuses S1 and S3 if the time period TP5 is equal to or shorter than the reference wireless time period TL. The slave controller SC3 is configured to conclude that the wireless communication is abnormal between the slave communication apparatuses S1 and S3 if the time period TP5 exceeds the reference wireless time period TL.

The slave controller SC1 is configured to measure the time period TP3 from the transmission of the confirmation signal CM5 via the wireless communication channel to receipt of the acknowledgement signal AS3 from the slave communication apparatus S3 via the wireless communication channel. The slave controller SC1 is configured to compare the time period TP3 with the reference wireless time period TL if the slave controller SC1 receives the acknowledgement signal AS3 via the wireless communication channel. The slave controller SC1 is configured to conclude that the wireless communication is normal between the slave communication apparatuses S1 and S3 if the time period TP3 is equal to or shorter than the reference wireless time period TL. The slave controller SC1 is configured to conclude that the wireless communication is abnormal between the slave communication apparatuses S1 and S3 if the time period TP3 exceeds the reference wireless time period TL.

As seen in FIGS. 5 and 6, the slave controller SC3 is configured to set the priority order PO in accordance with operational status information relating to operational status of at least one of the master wired communicator MD1, the slave wired communicator SD3, the master wireless communicator ML1, and the slave wireless communicator SL3. In this embodiment, the operational status information includes power supply information relating to status of power supply to at least one of the master wired communicator MD1, the slave wired communicator SD3, the master wireless communicator ML1, and the slave wireless communicator SL3.

The power supply information includes the voltage of electricity supplied from the electric power source PS and the remaining level of the electric power source SE3. The voltage of electricity supplied from the electric power source PS indicates the status of power supply to the slave wired communicator SD3 and the slave wireless communicator SL3. The remaining level of the electric power source SE3 indicates the status of power supply to the slave wired communicator SD3 and the slave wireless communicator SL3. The status of power supply of the electric power source PS is abnormal due to disconnection of the electric wiring structure WS and/or breakdown of the electric power source PS if the voltage sensed by the power-supply sensor SV3 is equal to or lower than the predetermined voltage VP. The status of power supply of the electric power source SE3 is abnormal due to disconnection of wiring and/or breakdown of the electric power source SE3 if the remaining level sensed by the power-supply sensor SV3 is equal to or higher than a predetermined level L5.

The slave controller SC3 is configured to set the priority order PO indicating that the wired communication channel is given priority over the wireless communication channel if the voltage sensed by the power-supply sensor SV3 is equal to or lower than the predetermined voltage VP and if the remaining level sensed by the power-supply sensor SV3 is equal to or higher than the predetermined level L5. The slave controller SC3 is configured to control the memory SC32 to store the priority order PO which is newly set by the slave controller SC3. The memory SC32 is configured to store the predetermined voltage VP and the predetermined level L5.

The slave controller SC3 is configured to set the priority order PO in accordance with error information E5 includes an error message transmitted by at least one of the master wired communicator MD1 or MD2, the master wireless communicator ML1 or ML2, the slave wired communicator SD3, and the slave wireless communicator SL3. In this embodiment, the slave controller SC3 is configured to detect the error information E5 including an error occurring in each of the slave wired communicator SD3 and the slave wireless communicator SL3. The slave controller SC3 is configured to set the priority order PO indicating that the wireless communication channel is given priority over the wired communication channel if the slave controller SC3 detects the error information E5 occurring in the slave wired communicator SD3. The slave controller SC3 is configured to set the priority order PO indicating that the wired communication channel is given priority over the wireless communication channel if the slave controller SC3 detects the error information E5 occurring in the slave wireless communicator SL3. However, the slave controller SC3 can be configured to set the priority order PO in accordance with the error information E5 including an error message transmitted by at least one of the slave wired communicator SD3 and the slave wireless communicator SL3.

Figure 16:
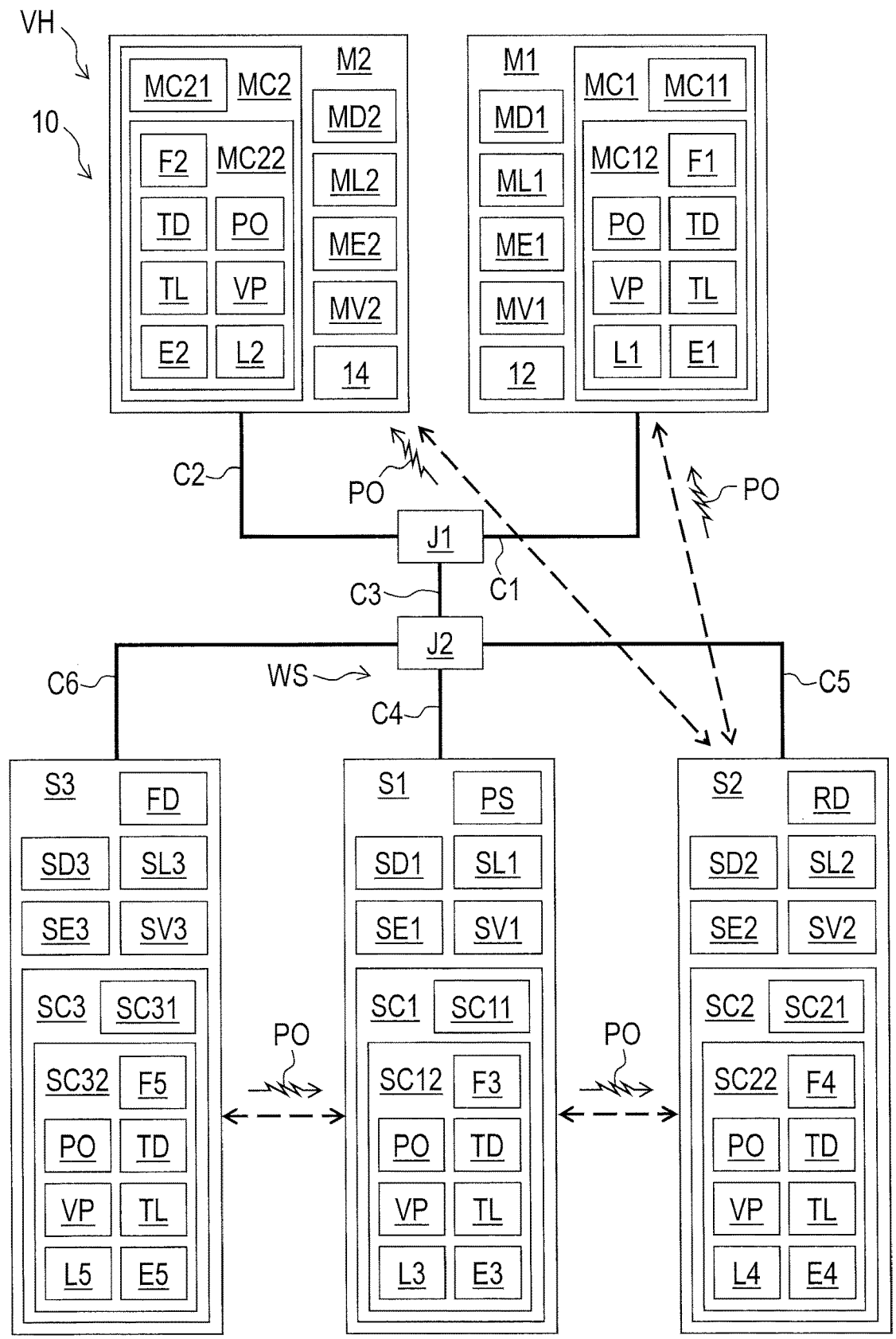
FIG. 16 is another schematic block diagram of the human-powered vehicle illustrated in FIG. 1 (transmission of the priority order via the wireless communication channel).
Figure 17:
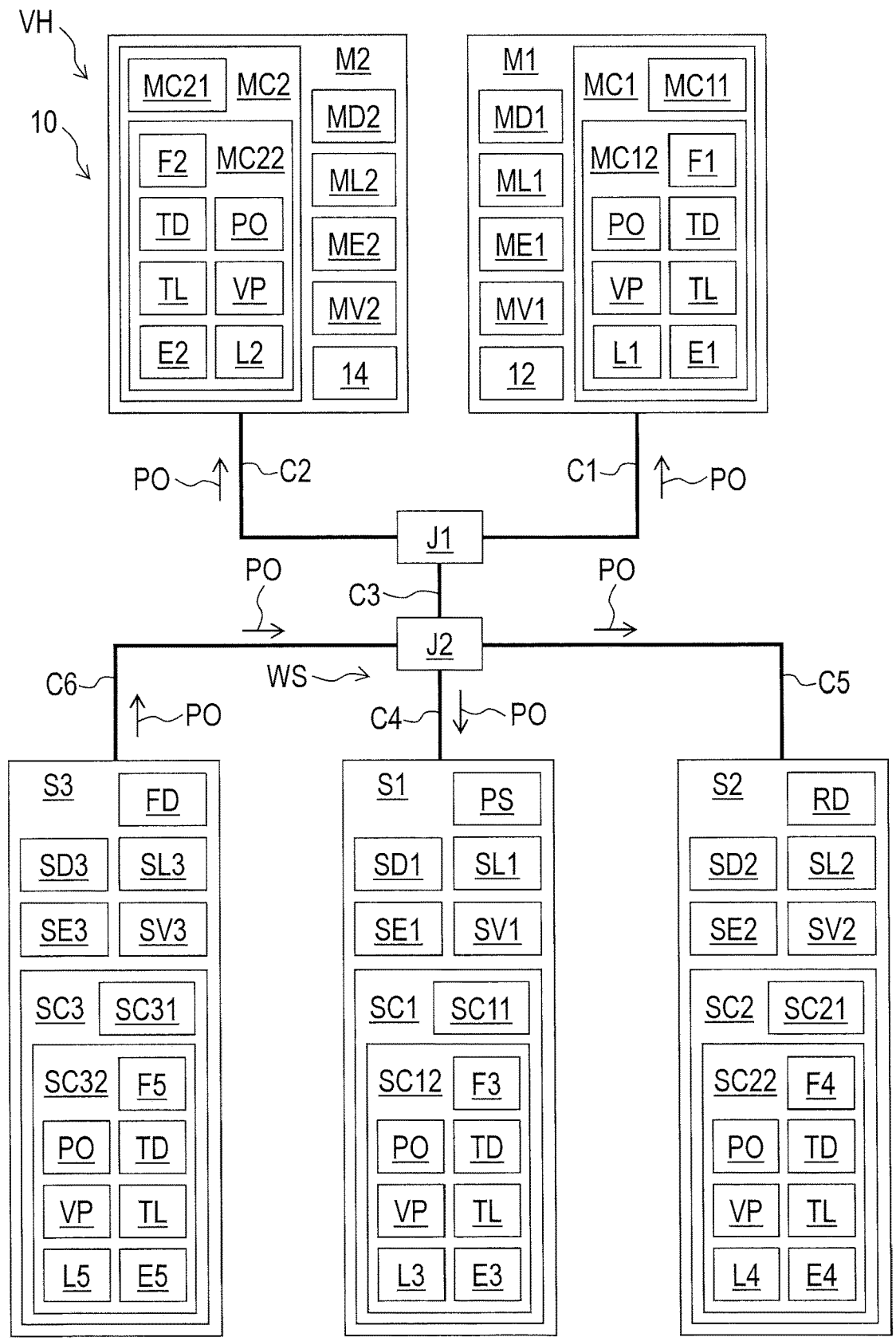
FIG. 17 is another schematic block diagram of the human-powered vehicle illustrated in FIG. 1 (transmission of the priority order via the wired communication channel).

As seen in FIGS. 16 and 17, the slave controller SC3 is configured to transmit the priority order PO to the master communication apparatus M1 and/or M2 via one of the wired communication channel and the wireless communication channel based on the communication information, the operational status information, and/or the error information E5.

As seen in FIG. 16, the slave controller SC3 is configured to transmit the priority order PO which is newly set by the slave controller SC3 to the slave communication apparatus S1 via the wireless communication channel if the slave controller SC3 newly sets the priority order PO indicating that the wireless communication channel is given priority over the wired communication channel. The slave controller SC1 is configured to transmit the priority order PO transmitted from the slave communication apparatus S3 to the slave communication apparatus S2 via the wireless communication channel. The slave controller SC2 is configured to transmit the priority order PO transmitted from the slave communication apparatus S1 to the master communication apparatuses M1 and M2 via the wireless communication channel.

As seen in FIG. 17, the slave controller SC3 is configured to transmit the priority order PO which is newly set by the slave controller SC3 to the master communication apparatuses M1 and M2 and the slave communication apparatuses S3 and S3 via the wired communication channel if the slave controller SC3 newly sets the priority order PO indicating that the wired communication channel is given priority over the wireless communication channel.

Modifications

Figure 18:
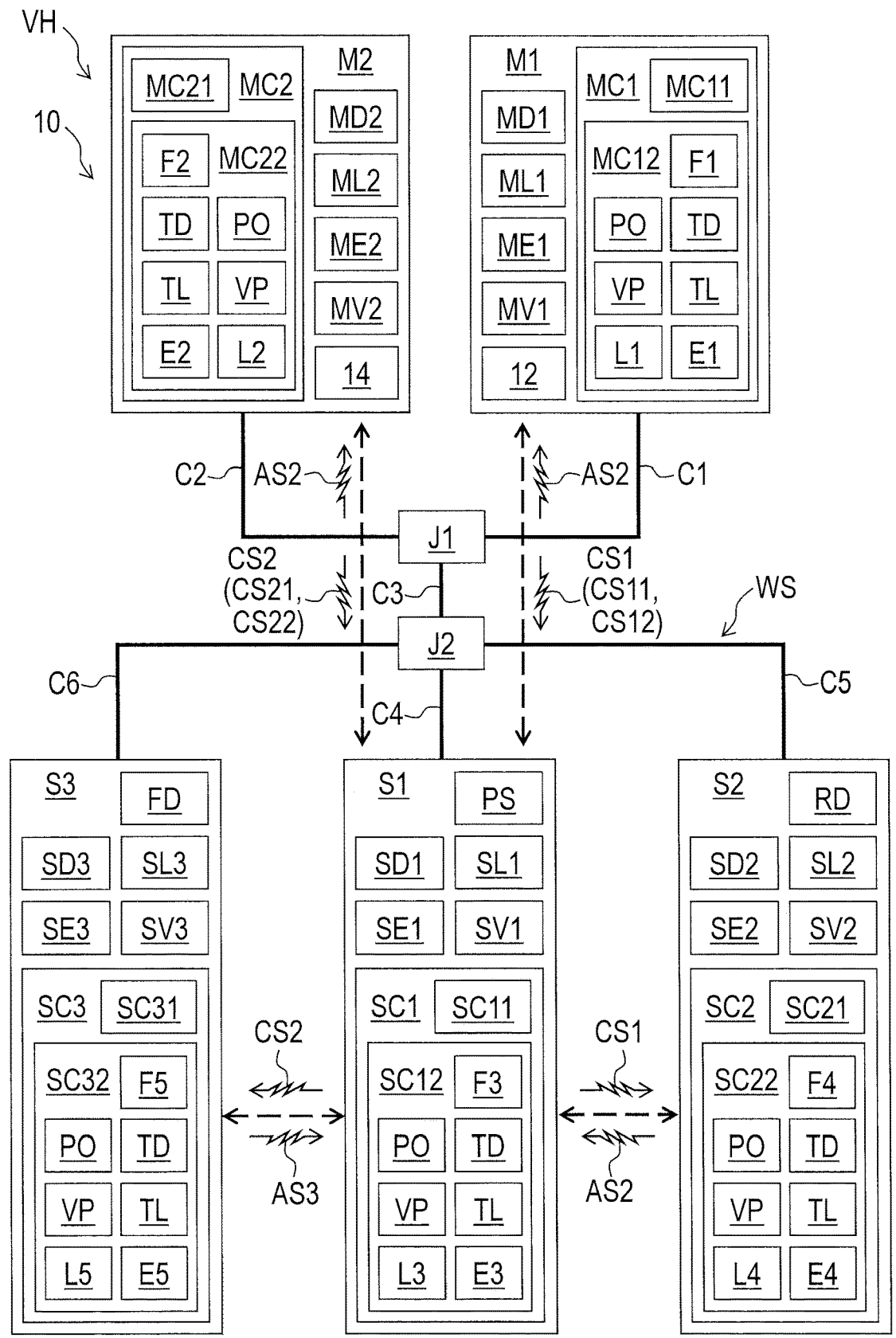
FIG. 18 is another schematic block diagram of the human-powered vehicle in accordance with a modification (the wireless communication).

The flows of signals via the wired communication channel and the wireless communication channel are not limited to the present embodiment. As seen in FIG. 18, for example, the slave communication apparatus S1 can be configured to receive the control signal CS1 and/or CS2 from the master communication apparatuses M1 and M2 via the wireless communication channel. The slave communication apparatus S1 can be configured to transmit the control signal CS1 to the slave communication apparatus S2 via the wireless communication channel. The slave communication apparatus S1 can be configured to transmit the control signal CS2 to the slave communication apparatus S3 via the wireless communication channel.

The master communication apparatus M1 can comprise another component other than the operating device 12. The master communication apparatus M2 can comprise another component other than the operating device 14. The slave communication apparatus S1 can comprise another component other than the electric power source PS. The slave communication apparatus S2 can comprise another component other than the electric component RD. The slave communication apparatus S3 can comprise another component other than the electric component FD. For example, each of the master communication apparatuses M1 and M2 and the slave communication apparatuses S1, S2, and S3 can comprise at least one of a braking device, a suspension, an adjustable seatpost, an auxiliary drive device, a lighting device, an imaging device, and a notification device.

The master communication apparatuses M1 and M2 and the slave communication apparatuses S2 and S3 respectively include the electric power sources ME1, ME2, SE2, and SE3. However, at least one of the electric power sources ME1, ME2, SE2, and SE3 can be omitted from the wireless communication system 10.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A master communication apparatus for a human-powered vehicle, comprising:
    a master wired communicator configured to communicate with a slave wired communicator of a slave communication apparatus in the human-powered vehicle via a wired communication channel;
    a master wireless communicator configured to communicate with a slave wireless communicator of the slave communication apparatus via a wireless communication channel; and
    a master controller configured to transmit, via one of the master wired communicator and the master wireless communicator, a control signal to control a component of the human-powered vehicle, the master controller being configured to control the master wired communicator and the master wireless communicator in accordance with a priority order stored in a memory of the master controller, the master controller being configured to set the priority order in accordance with communication information transmitted by at least one of the master communication apparatus and the slave communication apparatus.

2. The master communication apparatus according to claim 1, further comprising:
    an operating device including
        a user interface configured to receive a user input, and
        a base configured to be attached to a steering device of the human-powered vehicle, wherein
    the master controller is configured to generate the control signal in response to the user input, and
    the master wired communicator and the master wireless communicator are arranged on the base of the operating device.

3. The master communication apparatus according to claim 1, wherein
    the master controller is configured to set the priority order in accordance with communication information relating to the communication between the master communication apparatus and the slave communication apparatus.

4. The master communication apparatus according to claim 3, wherein
    the communication information relates to communication between the master wired communicator and the slave wired communicator.

5. The master communication apparatus according to claim 3, wherein
    the communication information relates to communication between the master wireless communicator and the slave wireless communicator.

6. The master communication apparatus according to claim 1, wherein
    the master controller is configured to set the priority order in accordance with operational status information relating to operational status of at least one of the master wired communicator, the slave wired communicator, the master wireless communicator, and the slave wireless communicator.

7. The master communication apparatus according to claim 6, wherein
    the operational status information includes power supply information relating to status of power supply to at least one of the master wired communicator, the slave wired communicator, the master wireless communicator, and the slave wireless communicator.

8. A wireless communication system for a human-powered vehicle, comprising:
    the master communication apparatus according to claim 1; and
    the slave communication apparatus configured to transmit the control signal to the electric component via the wired communication channel.

9. A master communication apparatus for a human-powered vehicle, comprising:
    a master wired communicator configured to communicate with a slave wired communicator of a slave communication apparatus in the human-powered vehicle via a wired communication channel;
    a master wireless communicator configured to communicate with a slave wireless communicator of the slave communication apparatus via a wireless communication channel;
    a master controller configured to transmit, via one of the master wired communicator and the master wireless communicator, a control signal to control an electric component of the human-powered vehicle, the master controller being configured to control the master wired communicator and the master wireless communicator; and an operating device including
a user interface configured to receive a user input, and
a base configured to be attached to a steering device of the human-powered vehicle, the master controller being configured to generate the control signal in response to the user input, the master wired communicator and the master wireless communicator being provided in the base of the operating device.

10. A master communication apparatus for a human-powered vehicle, comprising:
a master wired communicator configured to communicate with a slave wired communicator of a slave communication apparatus in the human-powered vehicle via a wired communication channel;
a master wireless communicator configured to communicate with a slave wireless communicator of the slave communication apparatus via a wireless communication channel; and
a master controller configured to transmit, via one of the master wired communicator and the master wireless communicator, a control signal to control a component of the human-powered vehicle, the master controller being configured to control the master wired communicator and the master wireless communicator in accordance with a priority order stored in a memory of the master controller, the master controller being configured to set the priority order in accordance with information relating to communication between the master communication apparatus and the slave communication apparatus, wherein
the communication information includes acknowledgement information relating to a time period from transmission of the control signal to receipt of an acknowledgement signal from the slave communication apparatus.

11. A master communication apparatus for a human-powered vehicle, comprising:
a master wired communicator configured to communicate with a slave wired communicator of a slave communication apparatus in the human-powered vehicle via a wired communication channel;
a master wireless communicator configured to communicate with a slave wireless communicator of the slave communication apparatus via a wireless communication channel; and
a master controller configured to transmit, via one of the master wired communicator and the master wireless communicator, a control signal to control a component of the human-powered vehicle, the master controller being configured to control the master wired communicator and the master wireless communicator in accordance with a priority order stored in a memory of the master controller, the master controller being configured to set the priority order in accordance with information relating to communication between the master communication apparatus and the slave communication apparatus, wherein
the master controller is configured to set the priority order in accordance with error information including an error message transmitted by at least one of the master wired communicator, the master wireless communicator, the slave wired communicator, and the slave wireless communicator.

12. A slave communication apparatus for a human-powered vehicle, comprising:
a slave wired communicator configured to communicate with a master wired communicator of a master communication apparatus in the human-powered vehicle via a wired communication channel;
a slave wireless communicator configured to communicate with a master wireless communicator of the master communication apparatus via a wireless communication channel; and
a slave controller configured to receive, via one of the slave wired communicator and the slave wireless communicator, a control signal to control an electric component of the human-powered vehicle, the slave controller being configured to control the slave wired communicator and the slave wireless communicator in accordance with a priority order stored in a memory of the slave controller, the slave controller being configured to set the priority order in accordance with communication information transmitted by at least one of the master communication apparatus and the slave communication apparatus.

13. The slave communication apparatus according to claim 12, wherein
the slave controller is configured to set the priority order in accordance with communication information relating to the communication between the master communication apparatus and the slave communication apparatus.

14. The slave communication apparatus according to claim 13, wherein
the communication information relates to communication between the master wired communicator and the slave wired communicator.

15. The slave communication apparatus according to claim 13, wherein
the communication information relates to communication between the master wireless communicator and the slave wireless communicator.

16. The slave communication apparatus according to claim 12, wherein
the slave controller is configured to set the priority order in accordance with operational status information relating to operational status of at least one of the master wired communicator, the slave wired communicator, the master wireless communicator, and the slave wireless communicator.

17. The slave communication apparatus according to claim 16, wherein
the operational status information includes power supply information relating to status of power supply to at least one of the master wired communicator, the slave wired communicator, the master wireless communicator, and the slave wireless communicator.

18. The slave communication apparatus according to claim 12, wherein
the slave controller is configured to transmit the priority order to the master communication apparatus via one of the wired communication channel and the wireless communication channel.

19. A wireless communication system for a human-powered vehicle, comprising:
the slave communication apparatus according to claim 12, the slave communication apparatus being configured to transmit the control signal to the component via the wired communication channel; and the master communication apparatus.

20. A slave communication apparatus for a human-powered vehicle, comprising:
- a slave wired communicator configured to communicate with a master wired communicator of a master communication apparatus in the human-powered vehicle via a wired communication channel;
- a slave wireless communicator configured to communicate with a master wireless communicator of the master communication apparatus via a wireless communication channel; and
- a slave controller configured to receive, via one of the slave wired communicator and the slave wireless communicator, a control signal to control an electric component of the human-powered vehicle, the slave controller being configured to control the slave wired communicator and the slave wireless communicator in accordance with a priority order stored in a memory of the slave controller, the slave controller being configured to set the priority order in accordance with information relating to communication between the master communication apparatus and the slave communication apparatus, wherein
- the slave controller is configured to set the priority order in accordance with error information includes an error message transmitted by at least one of the master wired communicator, the master wireless communicator, the slave wired communicator, and the slave wireless communicator.

* * * * *